(12) United States Patent
Saxena

(10) Patent No.: US 12,153,309 B2
(45) Date of Patent: Nov. 26, 2024

(54) BIREFRINGENT CELL

(71) Applicant: Envisics Ltd, Milton Keynes (GB)

(72) Inventor: Antariksh Saxena, Milton Keynes (GB)

(73) Assignee: Envisics Ltd, Milton Keynes (GB)

( * ) Notice: Subject to any disclaimer, the term of this patent is extended or adjusted under 35 U.S.C. 154(b) by 0 days.

(21) Appl. No.: 18/055,512

(22) Filed: Nov. 15, 2022

(65) Prior Publication Data

US 2023/0168544 A1     Jun. 1, 2023

(30) Foreign Application Priority Data

Nov. 26, 2021   (GB) ...................................... 2117098

(51) Int. Cl.
*G02F 1/1337* (2006.01)
*G02F 1/139* (2006.01)
*G02F 1/1362* (2006.01)

(52) U.S. Cl.
CPC .. *G02F 1/133784* (2013.01); *G02F 1/133723* (2013.01); *G02F 1/133746* (2021.01); *G02F 1/133761* (2021.01); *G02F 1/133788* (2013.01); *G02F 1/1393* (2013.01); *G02F 1/133726* (2021.01); *G02F 1/136277* (2013.01); *G02F 2203/12* (2013.01)

(58) Field of Classification Search
CPC ......... G02F 1/133784; G02F 1/133723; G02F 1/133746; G02F 1/133761; G02F 1/133788; G02F 1/1393; G02F 1/133726; G02F 1/136277; G02F 2203/12
See application file for complete search history.

(56) References Cited

U.S. PATENT DOCUMENTS

| 2006/0126156 | A1  | 6/2006  | Evans et al.                |
|--------------|-----|---------|-----------------------------|
| 2009/0040453 | A1  | 2/2009  | Chien et al.                |
| 2009/0279032 | A1  | 11/2009 | Kwok et al.                 |
| 2011/0310337 | A1* | 12/2011 | Ishihara ............... G02F 1/1395 |
|              |     |         | 349/123                     |
| 2018/0143438 | A1* | 5/2018  | Oh ..................... G02B 27/4261 |
| 2019/0033665 | A1* | 1/2019  | Mizusaki ................. G02F 1/13 |
| 2020/0218109 | A1* | 7/2020  | Um .................... G02F 1/133536 |

(Continued)

FOREIGN PATENT DOCUMENTS

| JP | H06 250184 A | 9/1994 |  |
|----|--------------|--------|--|
| JP | 2004 347686 A | 12/2004 |  |
| WO | WO-2004046803 A1 * | 6/2004 | ........ G02F 1/133711 |

OTHER PUBLICATIONS

Combined Search and Examination Report mailed on May 20, 2022 in UK Application GB 2117098.0 (5 pages).

(Continued)

*Primary Examiner* — Paisley L Wilson
*Assistant Examiner* — Agnes Dobrowolski
(74) *Attorney, Agent, or Firm* — Akerman LLP

(57) ABSTRACT

A method of fabricating an electrically-controlled birefringence cell. The cell has a cell gap no more than 20 micrometers. The cell has an alignment layer arranged to impart a pretilt on liquid crystal in contact with the alignment layer. The method comprises processing the alignment layer to achieve a surface anchoring value between the liquid crystal and alignment layer of less than 1 mJ/m$^2$.

20 Claims, 12 Drawing Sheets

(56) References Cited

U.S. PATENT DOCUMENTS

2021/0255490 A1  8/2021  Parsons et al.

OTHER PUBLICATIONS

Examination Report issued on Oct. 5, 2023 in UK Application GB 2117098.0 (5 pages).
Cui Yue et al., "Alignment layers with variable anchoring strengths from Polyvinyl Alcohol," Journal of Applied Physics, vol. 111, No. 6, pp. 63520-63520-7, published Mar. 27, 2012 (7 pages).
Extended European Search Report issued Apr. 3, 2023 in EPO Application EP 22 207 252.2-1020 (10 pages).
Office Action mailed on May 29, 2024 in Korean Application 10-2022-0161706 (6 pages).
English translation of Office Action mailed on May 29, 2024 in Korean Application 10-2022-0161706 (6 pages).
Office Action mailed on Dec. 14, 2023 in Korean Application 10-2022-0161706 (6 pages).
English translation of Office Action mailed on Dec. 14, 2023 in Korean Application 10-2022-0161706 (6 pages).

* cited by examiner

BIREFRINGENT CELL

CROSS-REFERENCE TO RELATED APPLICATIONS

This application claims priority under 35 U.S.C. § 119 to UK Patent Application GB 2117098.0, titled "Birefringent Cell," filed on Nov. 26, 2021, and currently pending. The entire contents of GB 2117098.0 are incorporated by reference herein for all purposes.

FIELD

The present disclosure relates to a birefringent cell, and to a method of fabricating a birefringent cell. More specifically, the present disclosure relates to a method of processing an alignment layer of an electrically-controlled birefringence cell. Some embodiments relate to processing an alignment layer of the cell to achieve one or more desired parameters, for example for reducing fringing field effects in the cell. Some embodiments relate to a spatial light modulator comprising the birefringent cell. Some embodiments relate to a holographic projector system comprising such a spatial light modulator.

INTRODUCTION

Light scattered from an object contains both amplitude and phase information. This amplitude and phase information can be captured on, for example, a photosensitive plate by well-known interference techniques to form a holographic recording, or "hologram", comprising interference fringes. The hologram may be reconstructed by illumination with suitable light to form a two-dimensional or three-dimensional holographic reconstruction, or replay image, representative of the original object.

Computer-generated holography may numerically simulate the interference process. A computer-generated hologram may be calculated by a technique based on a mathematical transformation such as a Fresnel or Fourier transform. These types of holograms may be referred to as Fresnel/Fourier transform holograms or simply Fresnel/Fourier holograms. A Fourier hologram may be considered a Fourier domain/plane representation of the object or a frequency domain/plane representation of the object. A computer-generated hologram may also be calculated by coherent ray tracing or a point cloud technique, for example.

A computer-generated hologram may be encoded on a spatial light modulator arranged to modulate the amplitude and/or phase of incident light. Light modulation may be achieved using electrically-addressable liquid crystals, optically-addressable liquid crystals or micro-mirrors, for example.

A spatial light modulator typically comprises a plurality of individually-addressable pixels which may also be referred to as cells or elements. The light modulation scheme may be binary, multilevel or continuous. Alternatively, the device may be continuous (i.e. is not comprised of pixels) and light modulation may therefore be continuous across the device. The spatial light modulator may be reflective meaning that modulated light is output in reflection. The spatial light modulator may equally be transmissive meaning that modulated light is output in transmission.

A holographic projector may be provided using the system described herein. Such projectors have found application in head-up displays, "HUD", and head-mounted displays, "HMD", including near-eye devices, for example.

A spatial light modulator typically comprises a plurality of individually-addressable pixels which may also be referred to as cells or elements. A common electrode and a matrix (or, array) of pixel electrodes are provided, wherein the size of the pixel electrodes delineates the size of the pixels of the device. In Liquid Crystal on Silicon, "LCOS", spatial light modulators a liquid crystal (LC) layer is provided between the common electrode and the array of pixel electrodes.

Liquid crystal on silicon, "LCOS", spatial light modulators exploit the birefringence of liquid crystals to provide controllable phase modulation, wherein an alternating polarity of voltage can be applied to each pixel electrode, whilst keeping common electrode fixed, in order to provide respective modulation (or, "retardation", or "retardance") in each cell. The so-called "dynamic range" of the cells of a spatial light modulator is the maximum achievable retardation (e.g., at V=0) minus the minimum achievable retardation (e.g., at V=V) that the cells can provide. It is generally desirable for a spatial light modulator to have a broad dynamic range, to be a useful and flexible as possible. The ideal phase modulator would be able to provide a variable phase retardation between zero and $2\pi$. The birefringence of the liquid crystal determines the optical path length required to provide the full $2\pi$ phase retardation. Specifically, the optical path length range for a reflective modulator should equal $2\pi$. The optical path length increases with the thickness of the liquid crystal layer (d), the birefringence of the liquid crystal ($\Delta n$) and the angle of incidence ($\theta$) of incident light.

In some applications, there is a desire to decrease the size of each individual pixel and to increase the number of pixels comprised within an LCOS device. This typically is of benefit when the aim is to achieve a high resolution. A drawback with this approach is, however, that each individual pixel is subjected to both a vertical and a horizontal electronic-field between adjacent electrodes. This can cause a non-uniform electric field across a single pixel, which in turn can cause distortion of the liquid crystal molecules that are driven by the non-uniform electric field. The effective phase retardation of each pixel therefore becomes different from the intended values. So-called "fringing field effect" (FFE) can result in poor optic contrast and non-uniform phase.

The inventor has addressed these problems. A holographic projector may be provided using the concepts described herein. Such projectors have found application in head-up displays, "HUD", and head-mounted displays, "HMD", including near-eye devices, for example.

SUMMARY

Aspects of the present disclosure are defined in the appended independent claims.

According to an aspect, a method is provided of fabricating an electrically-controlled birefringence cell having a cell gap no more than 20 micrometers and an alignment layer arranged to impart a pretilt on liquid crystal in contact with the alignment layer, wherein the pretilt may comprise a pretilt angle in the range 5 to 25 degrees such as 10 to 25 degrees or 15 to 25 degrees, and wherein the method comprises processing the alignment layer to achieve a surface anchoring value between the liquid crystal and alignment layer of less than 1 mJ/m².

By processing the alignment layer to deliberately provide a selected surface anchoring value between the liquid crystal and alignment layer of less than 1 mJ/m², the method utilizes a parameter that is conventionally overlooked, and reduces it to below the value that is typically found in electrically-controlled birefringence cells. As a result, the method provides improved performance of the cell, including reducing fringing field effects between adjacent pixels, and improved dynamic range for the cell. By reducing surface anchoring, the method enables the director (average direction of a molecule) in the liquid crystal (LC) layer to more readily and more quickly align when a voltage is applied across the cell. Thus, switching speeds are improved for the LC cell.

Because the method is a method of fabrication, and includes processing of an alignment layer before use, the resultant cell can be used in any suitable optical arrangement that conventional electrically-controlled birefringence cells are used in, and the benefits will be experienced each time the cell is used, without any additional steps having to be taken—or any additional components being required for use in conjunction with the cell—after fabrication. The method does not change the size or shape of an LC cell, as compared to conventional LC cells. Moreover, a variety of methods are available for processing the alignment layer, such that the fabrication is not significantly costly or complex to implement.

The electrically-controlled birefringence cell may be arranged with the liquid crystal in a planar or homogeneous alignment. Accordingly, the surface anchoring between the liquid crystal and alignment layer is a parallel anchoring strength relative to the surface of the substrate on which the alignment layer is formed.

The pretilt imparted by the alignment layer on the LC layer may comprise a pretilt angle in the range 5 to 25 degrees such as 10 to 25 degrees or 15 to 25 degrees. Processing the alignment layer may include increasing the pretilt above a conventional tilt angle, using any suitable method. Increasing the pretilt angle in addition to lowering the surface anchoring provides a harmonious effect, identified by the present inventor, which enables improved performance of the cell, including reducing fringing field effects between adjacent cells, and improved dynamic range for the cell. By increasing the pretilt angle, the method goes against the accepted convention in the field, which avoids increasing pretilts as it reduces the accessible range of different liquid crystal angles, and therefore is conventionally understood to reduce dynamic range (i.e., the range of retardance that the cell can achieve, as a function of voltage applied thereto). However, the present inventor has identified a combination of increased pretilt angle (i.e. relatively high compared to a typical value in a practical device) and reduced surface anchoring (i.e. relatively low compared to a typical value in a practical device) that actually increases dynamic range—because the negative effects of fringing fields are so significantly reduced.

Processing the alignment layer may comprise rubbing, characterized by at least one rubbing parameter. The at least one rubbing parameter may comprise rubbing pressure. Processing the alignment layer to reduce surface anchoring may comprise exerting a greater rubbing pressure than is conventionally applied to similar birefringence cells. The rubbing parameter may comprise rubbing direction. Processing the alignment layer to reduce surface anchoring may comprise changing a rubbing direction on a surface of the alignment layer.

Processing the alignment layer may comprise reducing the thickness of the alignment layer to below a thickness threshold typically applied for similar conventional cells. It may comprise providing an alignment layer thickness of no more than 100 nm. By reducing the thickness of the alignment layer, surface anchoring strength may be reduced.

The cell gap may be greater than 0.5 micrometers. For example, it may be up to 1 micrometer, or up to 2 micrometers, or up to 5 micrometers, or up to 20 micrometers.

The alignment layer may comprise a polymer, such as polyimide.

Processing the alignment layer may comprise exposing the alignment layer to ozone or an energy ion beam. This may be done to change the pretilt angle, such as to increase the pretilt angle.

The alignment layer may comprise a stack of polyimide layers, wherein each layer within the stack corresponds to a different pretilt angle. Processing the alignment layer may further comprise obtaining intermediate pretilt angles by mixing two or more layers of polyimide materials that are horizontally or vertically aligned with one another. Processing the alignment layer may comprise imprinting a pattern such as stripe on the alignment layer.

The alignment layer may comprise a photoalignment layer and processing the alignment layer may comprise controlling exposure of the alignment layer to infrared or ultraviolet light. This may be done to reduce the surface anchoring and/or to change the pretilt, such as to increase the pretilt.

The alignment layer may comprise reactive mesogens and processing the alignment layer may comprise controlling exposure of the alignment layer to ultraviolet light. This may be done to reduce the surface anchoring and/or to change the pretilt, such as to increase the pretilt.

The surface anchoring value may be no more than 0.1 mJ/m$^2$. Therefore, the method may involve reducing the surface anchoring to a level that is significantly below (for example, one tenth the value of) a typical surface anchoring value for conventional electronically-controlled birefringence cells.

The liquid crystal may have a birefringence greater than 0.2 such as greater than 0.3 or 0.4. The liquid crystal may be a nematic liquid crystal, including non-twisted and twisted nematic liquid crystal.

The cell may be a Freedericksz cell.

According to an aspect, an electrically controlled birefringence cell is provided comprising a cell gap no more than 20 micrometers and an alignment layer arranged to impart a pretilt angle in the range 5 to 25 degrees, such as in the range 10 to 25 degrees or 15 to 25 degrees, and a surface anchoring value less than 1 mJ/m$^2$ on liquid crystal in contact with the alignment layer.

The cell may be specifically fabricated to provide the pretilt angle in the range 10 to 25 degrees and the surface anchoring value less than 1 mJ/m$^2$. For example, additional and/or alternative and/or altered steps may be introduced into a conventional fabrication process, in order to achieve these parameter values. In particular, the alignment layer of the cell may be specifically processed to have a pretilt angle that is higher than the pretilt angle typically found in similar conventional cells, and a surface anchoring value that is lower than the surface anchoring values typically found in similar conventional cells.

According to an aspect, a method is provided of reducing fringing field effects in an electronically controlled birefringence cell. The method comprises processing an alignment layer of the cell, to increase a pretilt that the alignment layer imparts on liquid crystal in contact with the alignment layer. The method further comprises processing the alignment layer to achieve a reduced value of surface anchoring between the liquid crystal and alignment layer. The processing of the alignment layer may be carried out during fabrication of the electronically controlled birefringence cell.

According to an aspect, a method is provided of fabricating an electrically-controlled birefringence cell. The method comprises processing an alignment layer of the cell, to increase a pretilt that the alignment layer imparts on liquid crystal in contact with the alignment layer. The method further comprises processing the alignment layer to achieve a reduced value of surface anchoring between the liquid crystal and alignment layer.

The cell, according to any of the above aspects, may have a cell gap no more than 20 micrometers. Increasing the pretilt that the alignment layer imparts on the liquid crystal in contact with the alignment layer may comprise increasing a pretilt angle to be in the range 5 to 25 degrees, such as in the range 10 to 25 degrees, or in the range 15 to 25 degrees. Processing the alignment layer to achieve a reduced value of surface anchoring may comprise processing it to achieve surface anchoring value of less than 1 mJ/m$^2$. For example, the surface anchoring value may be approximately 1e–4 J/m$^2$.

An electrically controlled birefringence cell according to any of the above aspects, or fabricated according to a method of any of the above aspects, may be comprised within any suitable optical arrangement. It may be comprised within a spatial light modulator, such as a Liquid Crystal on Silicon (LCOS) spatial light modulator (SLM). Such an SLM may be configured as a display device for modulating incident light. The display device may be configured to display one or more holograms, optionally in combination with another feature such as a software lens and/or a software grating. The display device may be configured to display a hologram and to be suitable illuminated, to form a holographic reconstruction, corresponding to the hologram.

The term "hologram" is used to refer to the recording which contains amplitude information or phase information, or some combination thereof, regarding the object. The term "holographic reconstruction" is used to refer to the optical reconstruction of the object which is formed by illuminating the hologram. The system disclosed herein is described as a "holographic projector" because the holographic reconstruction is a real image and spatially-separated from the hologram. The term "replay field" is used to refer to the 2D area within which the holographic reconstruction is formed and fully focused. If the hologram is displayed on a spatial light modulator comprising pixels, the replay field will be repeated in the form of a plurality diffracted orders wherein each diffracted order is a replica of the zeroth-order replay field. The zeroth-order replay field generally corresponds to the preferred or primary replay field because it is the brightest replay field. Unless explicitly stated otherwise, the term "replay field" should be taken as referring to the zeroth-order replay field. The term "replay plane" is used to refer to the plane in space containing all the replay fields. The terms "image", "replay image" and "image region" refer to areas of the replay field illuminated by light of the holographic reconstruction. In some embodiments, the "image" may comprise discrete spots which may be referred to as "image spots" or, for convenience only, "image pixels".

The terms "encoding", "writing" or "addressing" are used to describe the process of providing the plurality of pixels of the SLM with a respective plurality of control values which respectively determine the modulation level of each pixel. It may be said that the pixels of the SLM are configured to "display" a light modulation distribution in response to receiving the plurality of control values. Thus, the SLM may be said to "display" a hologram and the hologram may be considered an array of light modulation values or levels.

It has been found that a holographic reconstruction of acceptable quality can be formed from a "hologram" containing only phase information related to the Fourier transform of the original object. Such a holographic recording may be referred to as a phase-only hologram. Embodiments relate to a phase-only hologram but the present disclosure is equally applicable to amplitude-only holography.

The present disclosure is also equally applicable to forming a holographic reconstruction using amplitude and phase information related to the Fourier transform of the original object. In some embodiments, this is achieved by complex modulation using a so-called fully complex hologram which contains both amplitude and phase information related to the original object. Such a hologram may be referred to as a fully-complex hologram because the value (grey level) assigned to each pixel of the hologram has an amplitude and phase component. The value (grey level) assigned to each pixel may be represented as a complex number having both amplitude and phase components. In some embodiments, a fully-complex computer-generated hologram is calculated.

Reference may be made to the phase value, phase component, phase information or, simply, phase of pixels of the computer-generated hologram or the spatial light modulator as shorthand for "phase-delay". That is, any phase value described is, in fact, a number (e.g. in the range 0 to $2\pi$) which represents the amount of phase retardation provided by that pixel. For example, a pixel of the spatial light modulator described as having a phase value of $\pi/2$ will retard the phase of received light by $\pi/2$ radians. In some embodiments, each pixel of the spatial light modulator is operable in one of a plurality of possible modulation values (e.g. phase delay values). The term "grey level" may be used to refer to the plurality of available modulation levels. For example, the term "grey level" may be used for convenience to refer to the plurality of available phase levels in a phase-only modulator even though different phase levels do not provide different shades of grey. The term "grey level" may also be used for convenience to refer to the plurality of available complex modulation levels in a complex modulator.

The hologram therefore comprises an array of grey levels—that is, an array of light modulation values such as an array of phase-delay values or complex modulation values. The hologram is also considered a diffractive pattern because it is a pattern that causes diffraction when displayed on a spatial light modulator and illuminated with light having a wavelength comparable to, generally less than, the pixel pitch of the spatial light modulator. Reference is made herein to combining the hologram with other diffractive patterns such as diffractive patterns functioning as a lens or grating. For example, a diffractive pattern functioning as a grating may be combined with a hologram to translate the replay field on the replay plane or a diffractive pattern functioning as a lens may be combined with a hologram to focus the holographic reconstruction on a replay plane in the near field.

Although different embodiments and groups of embodiments may be disclosed separately in the detailed description which follows, any feature of any embodiment or group of embodiments may be combined with any other feature or combination of features of any embodiment or group of embodiments. That is, all possible combinations and permutations of features disclosed in the present disclosure are envisaged.

BRIEF DESCRIPTION OF THE DRAWINGS

Specific embodiments are described by way of example only with reference to the following figures.

The same reference numbers will be used throughout the drawings to refer to the same or like parts.

DETAILED DESCRIPTION OF EMBODIMENTS

The present invention is not restricted to the embodiments described in the following but extends to the full scope of the appended claims. That is, the present invention may be embodied in different forms and should not be construed as limited to the described embodiments, which are set out for the purpose of illustration.

Terms of a singular form may include plural forms unless specified otherwise.

A structure described as being formed at an upper portion/lower portion of another structure or on/under the other structure should be construed as including a case where the structures contact each other and, moreover, a case where a third structure is disposed there between.

In describing a time relationship—for example, when the temporal order of events is described as "after", "subsequent", "next", "before" or suchlike—the present disclosure should be taken to include continuous and non-continuous events unless otherwise specified. For example, the description should be taken to include a case which is not continuous unless wording such as "just", "immediate" or "direct" is used.

Although the terms "first", "second", etc. may be used herein to describe various elements, these elements are not to be limited by these terms. These terms are only used to distinguish one element from another. For example, a first element could be termed a second element, and, similarly, a second element could be termed a first element, without departing from the scope of the appended claims.

Features of different embodiments may be partially or overall coupled to or combined with each other, and may be variously inter-operated with each other. Some embodiments may be carried out independently from each other, or may be carried out together in co-dependent relationship.

Optical Configuration

Figure 1:
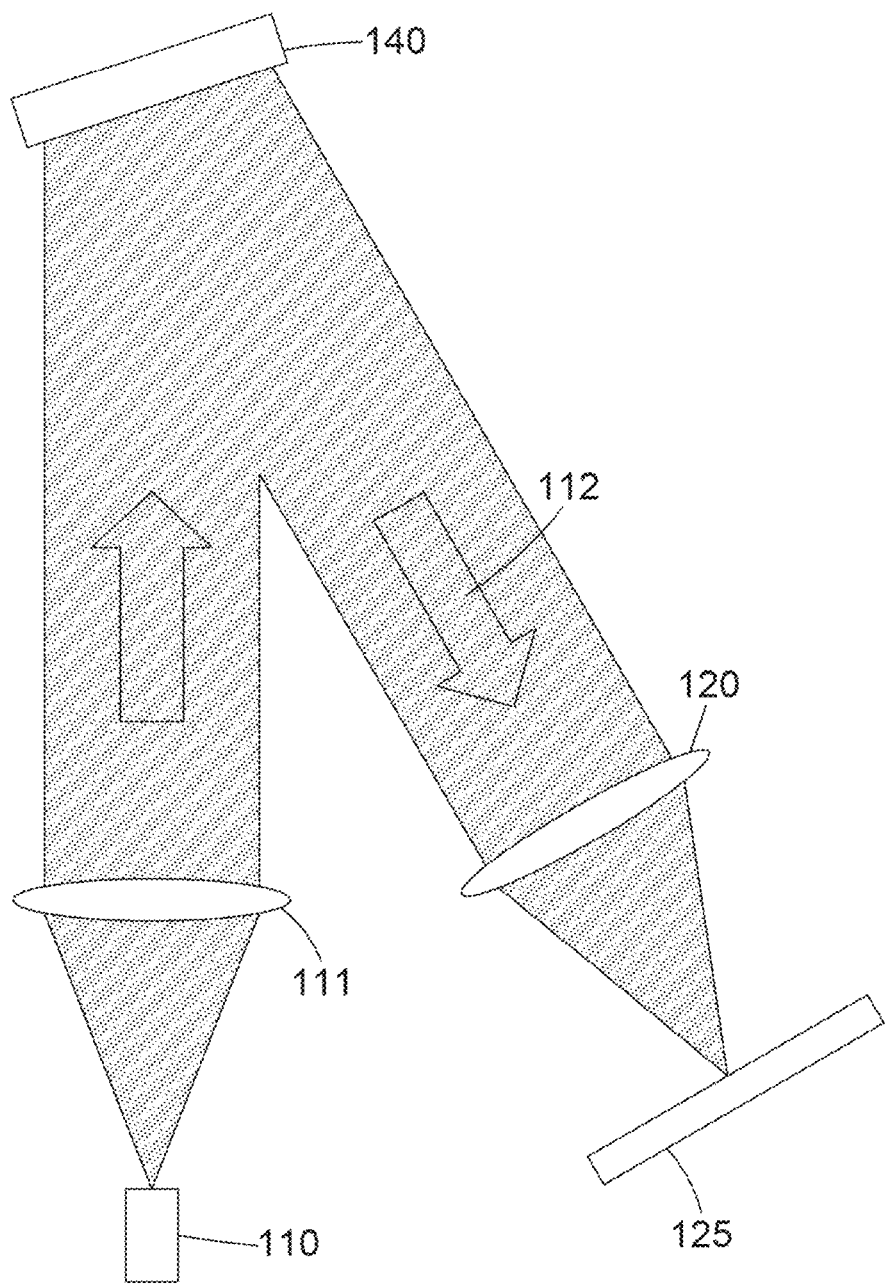
FIG. 1 is a schematic showing a reflective SLM producing a holographic reconstruction on a screen.

FIG. 1 shows an embodiment in which a computer-generated hologram is encoded on a single spatial light modulator. The computer-generated hologram is a Fourier transform of the object for reconstruction. It may therefore be said that the hologram is a Fourier domain or frequency domain or spectral domain representation of the object. In this embodiment, the spatial light modulator is a reflective liquid crystal on silicon, "LCOS", device. The hologram is encoded on the spatial light modulator and a holographic reconstruction is formed at a replay field, for example, a light receiving surface such as a screen or diffuser.

A light source 110, for example a laser or laser diode, is disposed to illuminate the SLM 140 via a collimating lens 111. The collimating lens causes a generally planar wavefront of light to be incident on the SLM. In FIG. 1, the direction of the wavefront is off-normal (e.g. two or three degrees away from being truly orthogonal to the plane of the transparent layer). However, in other embodiments, the generally planar wavefront is provided at normal incidence and a beam splitter arrangement is used to separate the input and output optical paths. In the embodiment shown in FIG. 1, the arrangement is such that light from the light source is reflected off a mirrored rear surface of the SLM and interacts with a light-modulating layer to form an exit wavefront 112. The exit wavefront 112 is applied to optics including a Fourier transform lens 120, having its focus at a screen 125. More specifically, the Fourier transform lens 120 receives a beam of modulated light from the SLM 140 and performs a frequency-space transformation to produce a holographic reconstruction at the screen 125.

Notably, in this type of holography, each pixel of the hologram contributes to the whole reconstruction. There is not a one-to-one correlation between specific points (or image pixels) on the replay field and specific light-modulating elements (or hologram pixels). In other words, modulated light exiting the light-modulating layer is distributed across the replay field.

In these embodiments, the position of the holographic reconstruction in space is determined by the dioptric (focusing) power of the Fourier transform lens. In the embodiment shown in FIG. 1, the Fourier transform lens is a physical lens. That is, the Fourier transform lens is an optical Fourier transform lens and the Fourier transform is performed optically. Any lens can act as a Fourier transform lens but the performance of the lens will limit the accuracy of the Fourier transform it performs. The skilled person understands how to use a lens to perform an optical Fourier transform.

Hologram Calculation

In some embodiments, the computer-generated hologram is a Fourier transform hologram, or simply a Fourier hologram or Fourier-based hologram, in which an image is reconstructed in the far field by utilising the Fourier transforming properties of a positive lens. The Fourier hologram is calculated by Fourier transforming the desired light field in the replay plane back to the lens plane. Computer-generated Fourier holograms may be calculated using Fourier transforms.

A Fourier transform hologram may be calculated using an algorithm such as the Gerchberg-Saxton algorithm. Furthermore, the Gerchberg-Saxton algorithm may be used to calculate a hologram in the Fourier domain (i.e. a Fourier transform hologram) from amplitude-only information in the spatial domain (such as a photograph). The phase information related to the object is effectively "retrieved"

from the amplitude-only information in the spatial domain. In some embodiments, a computer-generated hologram is calculated from amplitude-only information using the Gerchberg-Saxton algorithm or a variation thereof.

The Gerchberg Saxton algorithm considers the situation when intensity cross-sections of a light beam, $I_A(x, y)$ and $I_B(x, y)$, in the planes A and B respectively, are known and $I_A(x, y)$ and $I_B(x, y)$ are related by a single Fourier transform. With the given intensity cross-sections, an approximation to the phase distribution in the planes A and B, $\Psi_A(x, y)$ and $\Psi(x, y)$ respectively, is found. The Gerchberg-Saxton algorithm finds solutions to this problem by following an iterative process. More specifically, the Gerchberg-Saxton algorithm iteratively applies spatial and spectral constraints while repeatedly transferring a data set (amplitude and phase), representative of $I_A(x, y)$ and $I_B(x, y)$, between the spatial domain and the Fourier (spectral or frequency) domain. The corresponding computer-generated hologram in the spectral domain is obtained through at least one iteration of the algorithm. The algorithm is convergent and arranged to produce a hologram representing an input image. The hologram may be an amplitude-only hologram, a phase-only hologram or a fully complex hologram.

In some embodiments, a phase-only hologram is calculated using an algorithm based on the Gerchberg-Saxton algorithm such as described in British patent 2,498,170 or 2,501,112 which are hereby incorporated in their entirety by reference. However, embodiments disclosed herein describe calculating a phase-only hologram by way of example only. In these embodiments, the Gerchberg-Saxton algorithm retrieves the phase information $\Psi[u, v]$ of the Fourier transform of the data set which gives rise to a known amplitude information $T[x, y]$, wherein the amplitude information $T[x, y]$ is representative of a target image (e.g. a photograph). Since the magnitude and phase are intrinsically combined in the Fourier transform, the transformed magnitude and phase contain useful information about the accuracy of the calculated data set. Thus, the algorithm may be used iteratively with feedback on both the amplitude and the phase information. However, in these embodiments, only the phase information $\Psi[u, v]$ is used as the hologram to form a holographic representative of the target image at an image plane. The hologram is a data set (e.g. 2D array) of phase values.

In other embodiments, an algorithm based on the Gerchberg-Saxton algorithm is used to calculate a fully-complex hologram. A fully-complex hologram is a hologram having a magnitude component and a phase component. The hologram is a data set (e.g. 2D array) comprising an array of complex data values wherein each complex data value comprises a magnitude component and a phase component.

In some embodiments, the algorithm processes complex data and the Fourier transforms are complex Fourier transforms. Complex data may be considered as comprising (i) a real component and an imaginary component or (ii) a magnitude component and a phase component. In some embodiments, the two components of the complex data are processed differently at various stages of the algorithm.

Figure 2A:
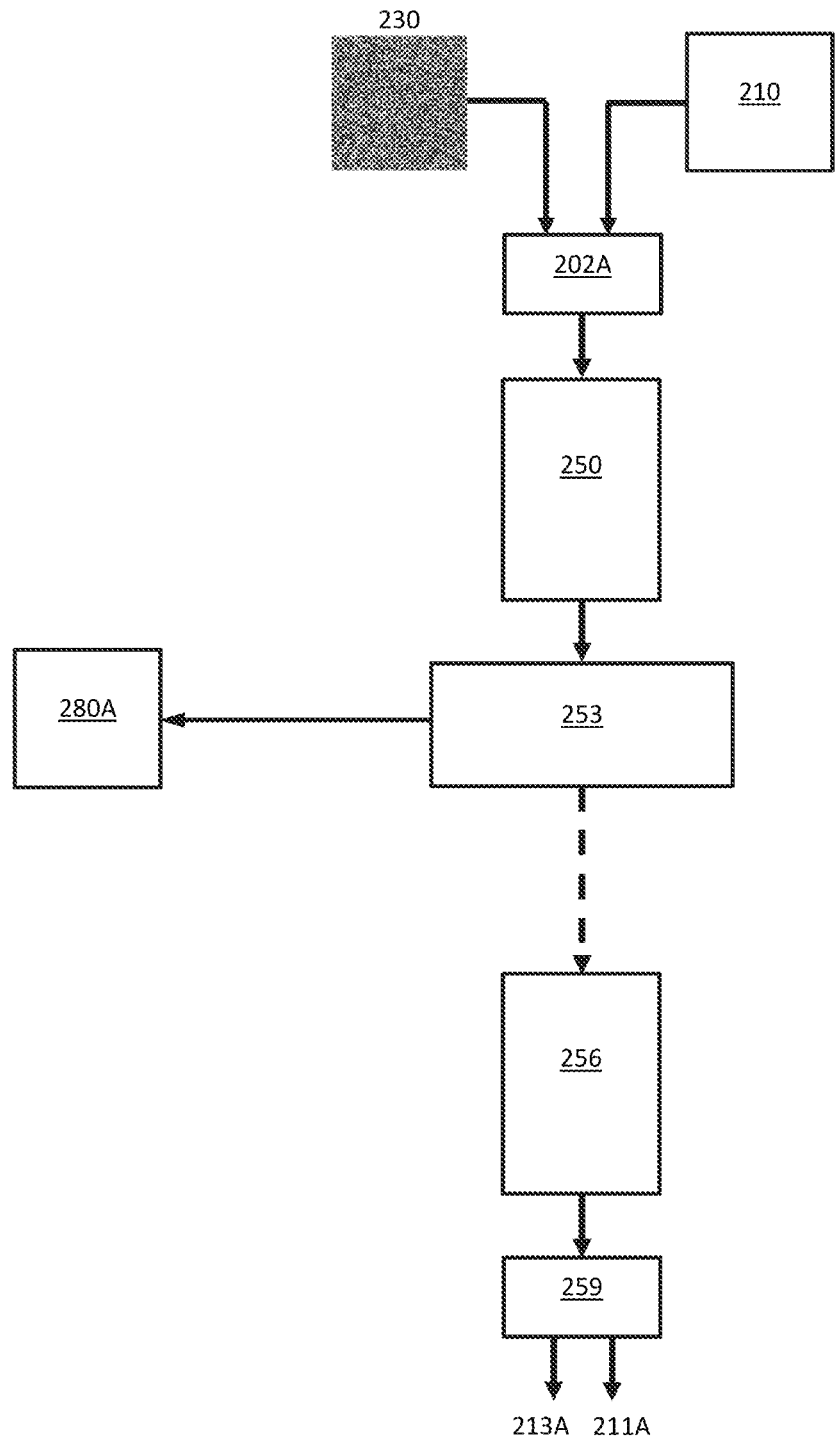
FIG. 2A illustrates a first iteration of an example Gerchberg-Saxton type algorithm.

FIG. 2A illustrates the first iteration of an algorithm in accordance with some embodiments for calculating a phase-only hologram. The input to the algorithm is an input image 210 comprising a 2D array of pixels or data values, wherein each pixel or data value is a magnitude, or amplitude, value. That is, each pixel or data value of the input image 210 does not have a phase component. The input image 210 may therefore be considered a magnitude-only or amplitude-only or intensity-only distribution. An example of such an input image 210 is a photograph or one frame of video comprising a temporal sequence of frames. The first iteration of the algorithm starts with a data forming step 202A comprising assigning a random phase value to each pixel of the input image, using a random phase distribution (or random phase seed) 230, to form a starting complex data set wherein each data element of the set comprising magnitude and phase. It may be said that the starting complex data set is representative of the input image in the spatial domain.

First processing block 250 receives the starting complex data set and performs a complex Fourier transform to form a Fourier transformed complex data set. Second processing block 253 receives the Fourier transformed complex data set and outputs a hologram 280A. In some embodiments, the hologram 280A is a phase-only hologram. In these embodiments, second processing block 253 quantises each phase value and sets each amplitude value to unity in order to form hologram 280A. Each phase value is quantised in accordance with the phase-levels which may be represented on the pixels of the spatial light modulator which will be used to "display" the phase-only hologram. For example, if each pixel of the spatial light modulator provides 256 different phase levels, each phase value of the hologram is quantised into one phase level of the 256 possible phase levels. Hologram 280A is a phase-only Fourier hologram which is representative of an input image. In other embodiments, the hologram 280A is a fully complex hologram comprising an array of complex data values (each including an amplitude component and a phase component) derived from the received Fourier transformed complex data set. In some embodiments, second processing block 253 constrains each complex data value to one of a plurality of allowable complex modulation levels to form hologram 280A. The step of constraining may include setting each complex data value to the nearest allowable complex modulation level in the complex plane. It may be said that hologram 280A is representative of the input image in the spectral or Fourier or frequency domain. In some embodiments, the algorithm stops at this point.

However, in other embodiments, the algorithm continues as represented by the dotted arrow in FIG. 2A. In other words, the steps which follow the dotted arrow in FIG. 2A are optional (i.e. not essential to all embodiments).

Third processing block 256 receives the modified complex data set from the second processing block 253 and performs an inverse Fourier transform to form an inverse Fourier transformed complex data set. It may be said that the inverse Fourier transformed complex data set is representative of the input image in the spatial domain.

Fourth processing block 259 receives the inverse Fourier transformed complex data set and extracts the distribution of magnitude values 211A and the distribution of phase values 213A. Optionally, the fourth processing block 259 assesses the distribution of magnitude values 211A. Specifically, the fourth processing block 259 may compare the distribution of magnitude values 211A of the inverse Fourier transformed complex data set with the input image 510 which is itself, of course, a distribution of magnitude values. If the difference between the distribution of magnitude values 211A and the input image 210 is sufficiently small, the fourth processing block 259 may determine that the hologram 280A is acceptable. That is, if the difference between the distribution of magnitude values 211A and the input image 210 is sufficiently small, the fourth processing block 259 may determine that the hologram 280A is a sufficiently-accurate representative of the input image 210. In some embodiments, the distribution of phase values 213A of the inverse Fourier transformed complex data set is ignored for the purpose of the comparison. It will be appreciated that any number of different methods for comparing the distribution of magnitude values 211A and the input image 210 may be employed and the present disclosure is not limited to any particular method. In some embodiments, a mean square difference is calculated and if the mean square difference is less than a threshold value, the hologram 280A is deemed acceptable. If the fourth processing block 259 determines that the hologram 280A is not acceptable, a further iteration of the algorithm may be performed. However, this comparison step is not essential and in other embodiments, the number of iterations of the algorithm performed is predetermined or preset or user-defined.

Figure 2B:
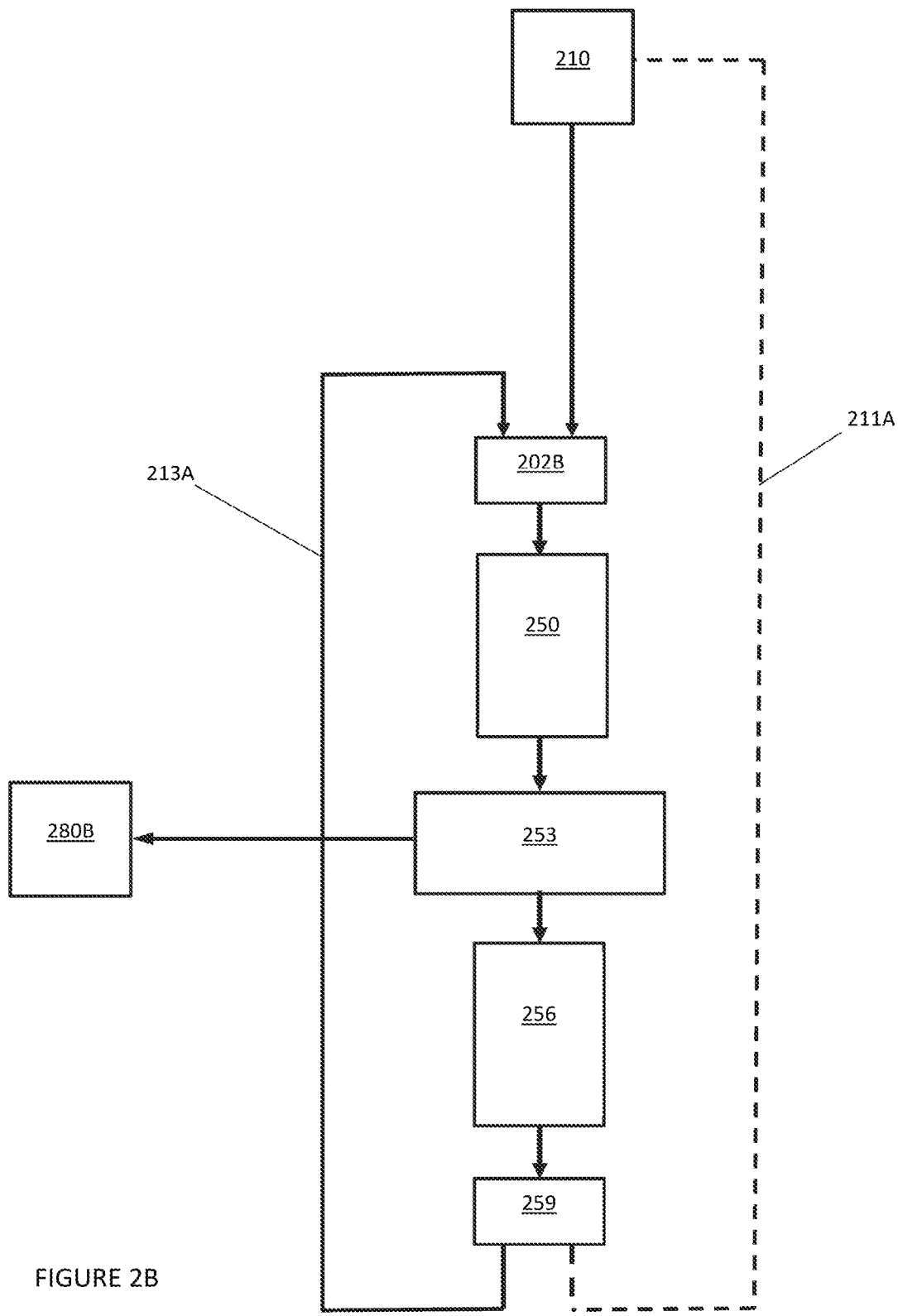
FIG. 2B illustrates the second and subsequent iterations of the example Gerchberg-Saxton type algorithm.

FIG. 2B represents a second iteration of the algorithm and any further iterations of the algorithm. The distribution of phase values 213A of the preceding iteration is fed-back through the processing blocks of the algorithm. The distribution of magnitude values 211A is rejected in favour of the distribution of magnitude values of the input image 210. In the first iteration, the data forming step 202A formed the first complex data set by combining distribution of magnitude values of the input image 210 with a random phase distribution 230. However, in the second and subsequent iterations, the data forming step 202B comprises forming a complex data set by combining (i) the distribution of phase values 213A from the previous iteration of the algorithm with (ii) the distribution of magnitude values of the input image 210.

The complex data set formed by the data forming step 202B of FIG. 2B is then processed in the same way described with reference to FIG. 2A to form second iteration hologram 280B. The explanation of the process is not therefore repeated here. The algorithm may stop when the second iteration hologram 280B has been calculated. However, any number of further iterations of the algorithm may be performed. It will be understood that the third processing block 256 is only required if the fourth processing block 259 is required or a further iteration is required. The output hologram 280B generally gets better with each iteration. However, in practice, a point is usually reached at which no measurable improvement is observed or the positive benefit of performing a further iteration is out-weighted by the negative effect of additional processing time. Hence, the algorithm is described as iterative and convergent.

Figure 2C:
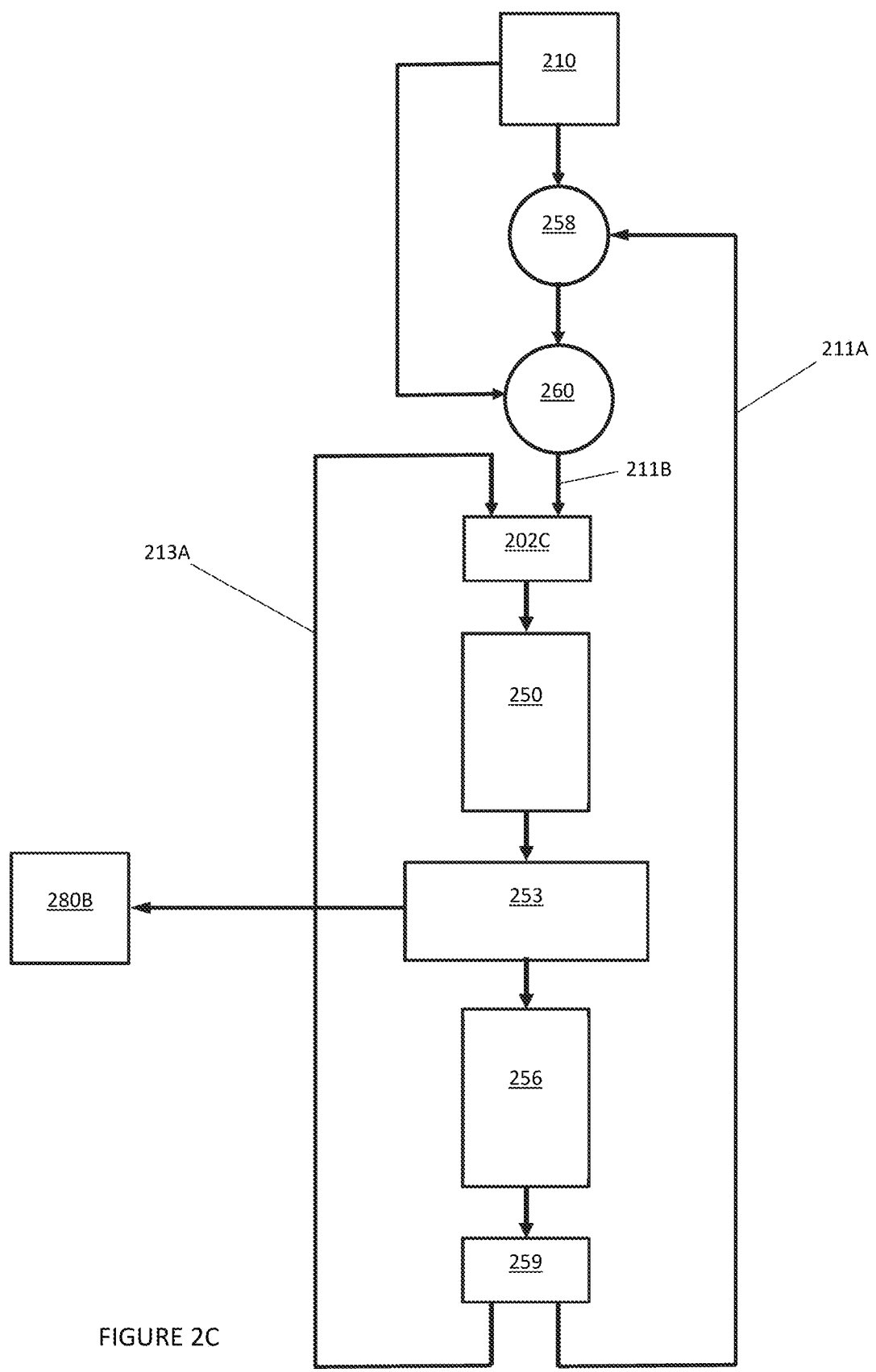
FIG. 2C illustrates alternative second and subsequent iterations of the example Gerchberg-Saxton type algorithm.

FIG. 2C represents an alternative embodiment of the second and subsequent iterations. The distribution of phase values 213A of the preceding iteration is fed-back through the processing blocks of the algorithm. The distribution of magnitude values 211A is rejected in favour of an alternative distribution of magnitude values. In this alternative embodiment, the alternative distribution of magnitude values is derived from the distribution of magnitude values 211 of the previous iteration. Specifically, processing block 258 subtracts the distribution of magnitude values of the input image 210 from the distribution of magnitude values 211 of the previous iteration, scales that difference by a gain factor α and subtracts the scaled difference from the input image 210. This is expressed mathematically by the following equations, wherein the subscript text and numbers indicate the iteration number:

$$R_{n+1}[x,y] = F'\{\exp(i\psi_n[u,v])\}$$

$$\psi_n[u,v] = \angle F\{\eta \cdot \exp(i \angle R_n[x,y])\}$$

$$\eta = T[x,y] - \alpha(|R_n[x,y]| - T[x,y])$$

where:
F' is the inverse Fourier transform;
F is the forward Fourier transform;
R[x, y] is the complex data set output by the third processing block 256;
T[x, y] is the input or target image;
∠ is the phase component;
Ψ is the phase-only hologram 280B;
η is the new distribution of magnitude values 211B; and
α is the gain factor.

The gain factor α may be fixed or variable. In some embodiments, the gain factor α is determined based on the size and rate of the incoming target image data. In some embodiments, the gain factor α is dependent on the iteration number. In some embodiments, the gain factor α is solely function of the iteration number.

The embodiment of FIG. 2C is the same as that of FIG. 2A and FIG. 2B in all other respects. It may be said that the phase-only hologram Ψ(u, v) comprises a phase distribution in the frequency or Fourier domain.

In some embodiments, the Fourier transform is performed using the spatial light modulator. Specifically, the hologram data is combined with second data providing optical power. That is, the data written to the spatial light modulation comprises hologram data representing the object and lens data representative of a lens. When displayed on a spatial light modulator and illuminated with light, the lens data emulates a physical lens—that is, it brings light to a focus in the same way as the corresponding physical optic. The lens data therefore provides optical, or focusing, power. In these embodiments, the physical Fourier transform lens 120 of FIG. 1 may be omitted. It is known how to calculate data representative of a lens. The data representative of a lens may be referred to as a software lens. For example, a phase-only lens may be formed by calculating the phase delay caused by each point of the lens owing to its refractive index and spatially-variant optical path length. For example, the optical path length at the centre of a convex lens is greater than the optical path length at the edges of the lens. An amplitude-only lens may be formed by a Fresnel zone plate. It is also known in the art of computer-generated holography how to combine data representative of a lens with a hologram so that a Fourier transform of the hologram can be performed without the need for a physical Fourier lens. In some embodiments, lensing data is combined with the hologram by simple addition such as simple vector addition. In some embodiments, a physical lens is used in conjunction with a software lens to perform the Fourier transform. Alternatively, in other embodiments, the Fourier transform lens is omitted altogether such that the holographic reconstruction takes place in the far-field. In further embodiments, the hologram may be combined in the same way with grating data—that is, data arranged to perform the function of a grating such as image steering. Again, it is known in the field how to calculate such data. For example, a phase-only grating may be formed by modelling the phase delay caused by each point on the surface of a blazed grating. An amplitude-only grating may be simply superimposed with an amplitude-only hologram to provide angular steering of the holographic reconstruction. The second data providing lensing and/or steering may be referred to as a light processing function or light processing pattern to distinguish from the hologram data which may be referred to as an image forming function or image forming pattern.

In some embodiments, the Fourier transform is performed jointly by a physical Fourier transform lens and a software lens. That is, some optical power which contributes to the Fourier transform is provided by a software lens and the rest of the optical power which contributes to the Fourier transform is provided by a physical optic or optics.

In some embodiments, there is provided a real-time engine arranged to receive image data and calculate holograms in real-time using the algorithm. In some embodiments, the image data is a video comprising a sequence of image frames. In other embodiments, the holograms are pre-calculated, stored in computer memory and recalled as needed for display on a SLM. That is, in some embodiments, there is provided a repository of predetermined holograms.

Embodiments relate to Fourier holography and Gerchberg-Saxton type algorithms by way of example only. The present disclosure is equally applicable to Fresnel holography and Fresnel holograms which may be calculated by a similar method. The present disclosure is also applicable to holograms calculated by other techniques such as those based on point cloud methods.

Light Modulation

A spatial light modulator may be used to display the diffractive pattern including the computer-generated hologram. If the hologram is a phase-only hologram, a spatial light modulator which modulates phase is required. If the hologram is a fully-complex hologram, a spatial light modulator which modulates phase and amplitude may be used or a first spatial light modulator which modulates phase and a second spatial light modulator which modulates amplitude may be used.

In some embodiments, the light-modulating elements (i.e. the pixels) of the spatial light modulator are cells containing liquid crystal. That is, in some embodiments, the spatial light modulator is a liquid crystal device in which the optically-active component is the liquid crystal. Each liquid crystal cell is configured to selectively-provide a plurality of light modulation levels. That is, each liquid crystal cell is configured at any one time to operate at one light modulation level selected from a plurality of possible light modulation levels. Each liquid crystal cell is dynamically-reconfigurable to a different light modulation level from the plurality of light modulation levels. In some embodiments, the spatial light modulator is a reflective liquid crystal on silicon (LCOS) spatial light modulator but the present disclosure is not restricted to this type of spatial light modulator.

A LCOS device provides a dense array of light modulating elements, or pixels, within a small aperture (e.g. a few centimetres in width). The pixels are typically approximately 10 microns or less which results in a diffraction angle of a few degrees meaning that the optical system can be compact. It is easier to adequately illuminate the small aperture of a LCOS SLM than it is the larger aperture of other liquid crystal devices. An LCOS device is typically reflective which means that the circuitry which drives the pixels of a LCOS SLM can be buried under the reflective surface. The results in a higher aperture ratio. In other words, the pixels are closely packed meaning there is very little dead space between the pixels. This is advantageous because it reduces the optical noise in the replay field. A LCOS SLM uses a silicon backplane which has the advantage that the pixels are optically flat. This is particularly important for a phase modulating device.

Figure 3:
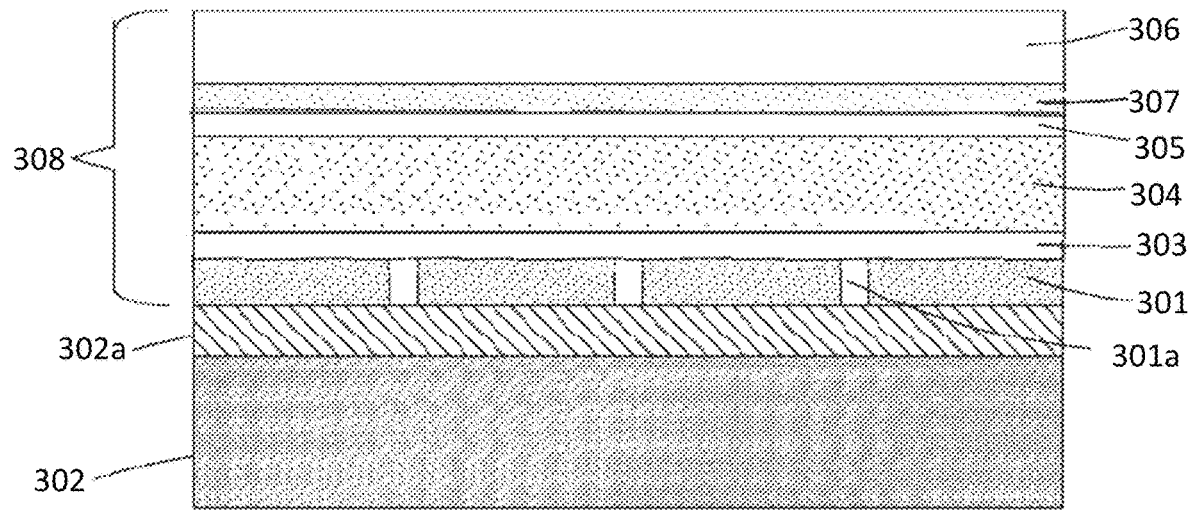
FIG. 3 is a schematic of a reflective LCOS SLM.

A suitable LCOS SLM is described below, by way of example only, with reference to FIG. 3. An LCOS device is formed using a single crystal silicon substrate 302. It has a 2D array of square planar aluminium electrodes 301, spaced apart by a gap 301a, arranged on the upper surface of the substrate. Each of the electrodes 301 can be addressed via circuitry 302a buried in the substrate 302. Each of the electrodes forms a respective planar mirror. An alignment layer 303 is disposed on the array of electrodes, and a liquid crystal layer 304 is disposed on the alignment layer 303. A second alignment layer 305 is disposed on the planar transparent layer 306, e.g. of glass. A single transparent electrode 307 e.g. of ITO is disposed between the transparent layer 306 and the second alignment layer 305.

Each of the square electrodes 301 defines, together with the overlying region of the transparent electrode 307 and the intervening liquid crystal material, a controllable phase-modulating element 308, often referred to as a pixel. The effective pixel area, or fill factor, is the percentage of the total pixel which is optically active, taking into account the space between pixels 301a. By control of the voltage applied to each electrode 301 with respect to the transparent electrode 307, the properties of the liquid crystal material of the respective phase modulating element may be varied, thereby to provide a variable delay to light incident thereon. The effect is to provide phase-only modulation to the wavefront, i.e. no amplitude effect occurs.

The described LCOS SLM outputs spatially modulated light in reflection. Reflective LCOS SLMs have the advantage that the signal lines, gate lines and transistors are below the mirrored surface, which results in high fill factors (typically greater than 90%) and high resolutions. Another advantage of using a reflective LCOS spatial light modulator is that the liquid crystal layer can be half the thickness than would be necessary if a transmissive device were used. This greatly improves the switching speed of the liquid crystal (a key advantage for the projection of moving video images). However, the teachings of the present disclosure may equally be implemented using a transmissive LCOS SLM.

Improved Fabrication

The following description refers to a LCOS SLM by way of example only of an electrically controlled birefringence (ECB) cell.

Conventional LCOS SLM's are known to suffer from problems such as fringing field effects, wherein distortions or "disclinations" in the arrangement (e.g. ordering) of the LC's with the LC layer appear when a voltage is applied across the device, causing the effective phase retardation across at least part of the device cells to be different from the intended values. This can result in poor optic contrast and non-uniform phase modulation being provided by conventional LCOS SLM's. Conventional approaches for tackling fringing field effects are generally insufficiently effective and/or are not practical. For example, it has been found that disclinations may reduce, in some circumstances, when a very high voltage (such as a voltage of 10V or higher) is applied across an LC cell. However, in practice it is not desirable or practical to apply such high voltages to LC devices. Other problems with conventional SLM's include limited dynamic range—for example, it is conventionally understood that an LCOS device should provide a low pretilt on its LC layer, since a high pretilt would reduce the available range of angles of incident light, and thereby decrease dynamic range of the device.

The present inventor has identified improvements that enable an SLM such as an LCOS SLM (or, "LCOS device") to be provided that experiences reduced fringing field effects whilst providing improved (i.e., increased) dynamic range, as compared to conventional SLM's. The improvements disclosed herein can be provided as part of a fabrication or pre-processing step, such that the resulting LCOS device can then be used in a similar manner to conventional LCOS devices but yielding improved performance results. In particular, the present inventor has identified particular features of an LCOS device, and parameters relating to those features, that may be processed, manipulated, or tuned, in order to provide improved dynamic range and reduced fringing field effects.

The present inventor has identified that an alignment layer of an LCOS device may be configured to provide improved dynamic range and reduced fringing field effects. The alignment layer is arranged adjacent to a liquid crystal (LC) layer in an LCOS device and can be used to influence the orientation of the directors of the liquid crystals (LC's) in the LC layer. More than one such alignment layer may be provided—for example, two alignment layers may be provided, one on either side (e.g., above and below) the LC layer. An alignment layer may be referred to as being a "surface alignment layer".

Multiple parameters relating to an alignment layer may be changed, or tuned, or manipulated, during fabrication of an LCOS device, each/all of which may affect the LC characteristics and their electric and/or optical performance. For example, mechanical rubbing may be used to influence the direction of orientation of the LCs in the LC layer. For example, surface features such as a grating may be provided on an alignment layer. For example, an alignment layer may be tilted, or otherwise processed, in order to provide a pretilt to the LC's, of a predetermined pretilt angle value.

The present inventor has identified that the strength of the interaction/attraction between molecules of the alignment layer and the LC's—which is known as the "surface anchoring" that the alignment layer provides—may also (or instead) be altered, in order to change the electric/optical performance of an LCOS device. Conventionally, although surface anchoring is a known parameter, it is not deliberately changed or manipulated during the fabrication of conventional LCOS devices. Instead, the conventional understanding is that, when an LCOS device is manufactured, with an alignment layer adjacent an LC layer, the surface anchoring is a parameter that results from the inherent attractive forces between the molecules of the alignment layer and the LC molecules. However, the present inventor has identified that in fact surface anchoring may be specifically changed, and a surface anchoring value/strength may be selected to help improve the performance of an LCOS device.

The present inventor has identified that both pretilt angle and surface anchoring can be selectively and intelligently manipulated, in harmony with one another, during fabrication of an LCOS device, in order to provide reduced fringing field effects and improved dynamic range. In particular, they have identified that a combination of increasing the pretilt angle and lowering the surface anchoring of an alignment surface, as compared to the values used in conventional LCOS arrangements, provides improved performance.

According to the recognitions made by the present inventor, the alignment layer is configured to impart a suitably low surface anchoring on the LC directors such that light experiences an increased phase offset between its ordinary and extraordinary components for a particular drive voltage. As a result, the available retardation (i.e., the dynamic range) of the cells of the LCOS device is increased. Moreover, the alignment layer may be configured to impart a relatively high predetermined pretilt (or, a "tilt angle") on the directors of the liquid crystals (LC's) in the LC layer, in order to enhance the benefits provided by the lowered surface anchoring.

The present inventor has identified that increasing the pretilt angle and lowering the surface anchoring of an alignment surface improves the order of the LC crystals in a switched "ON" LC cell—i.e., associated with a switched "ON" pixel electrode. The person skilled in the art will be aware that crystals of a nematic material do not have positional order, but they self-align to have long range directional order with their long axes roughly parallel. The average direction of a molecule (n) can be either an average over time at a point in space or an average over space at definite time. The state of the n director cannot be distinguished in the absence of electric or magnetic field as the director can be either pointing upwards or downwards and there is complete equivalence between + and −n director.

The "order parameter" (S) is conventionally used to quantify order of LC materials wherein, S quantifies the degree of alignment and can be written as:

$$S = 3\cos(\theta)^2 - \tfrac{1}{2},$$

where θ is the angle between any molecule and the average director, n. If all the molecules in the liquid crystal are perfectly ordered and aligned (forming θ=0° with the director) then the order parameter S will be 1 and all the molecules are pointing in the same direction. For a non-ordered system or isotropic system, the order parameter S approaches to zero and θ≈90°.

The present inventor has identified that the improvements disclosed herein—wherein an optimised LCOS is provided, with decreased surface anchoring and preferably also an increased pretilt angle—enable much of the disturbance (of the uniformity of the electric field) that is conventionally created by fringing field effects away from the pixel area of a switched "ON" pixel and towards the inter-pixel-gap, and/or towards adjacent switched "OFF" pixel electrodes. This results in an improved S value (i.e., improved order of the LC's) for the switched "ON" cell. This creates order defects of approximately S=±½ over the interpixel gap, which breaks the surface anchoring effect and is beneficial in terms of improving contrast and phase modulation.

The present inventor has identified values, or ranges of values, for pretilt and surface anchoring, that can provide an improved cell for an LCOS device, as will be understood from the detailed description herebelow.

The present inventor has gone against conventional thinking in providing the improvements described herein. This is because surface anchoring is not typically a parameter that is manipulated in its own right, with respect to fabrication or processing or operation of LC cells. Moreover, using high pretilts is usually avoided for alignment layers in LCOS devices as it is conventionally accepted that they would limit the available angular range of the liquid crystals and so limit the dynamic range of the modulator. However, the present inventor has identified that combining a high pretilt with a low level of surface anchoring, as described herein, in fact has the effect of increasing dynamic range of the device. Therefore, the present inventor has overcome several biases in the technical field of LC cell fabrication, by implementing a balance of increased pretilt angle and lower surface anchoring as disclosed herein.

Referring again to the embodiment of FIG. 3—which shows a conventional LCOS device—it can be seen that a first alignment layer 303 is disposed on the array of pixel electrodes 301 (each of which defines a respective cell, or pixel, of the LCOS device therein), below the LC layer 304. A second alignment layer 305 is provided above the LC layer 304, adjacent the single transparent electrode 307 (which may be referred to as being the "common electrode"). The improvements described herein may be provided for one or both alignment layers, in devices such as that of FIG. 3, which comprise two alignment layers. The improvements described herein may also be provided in arrangements that comprise only one alignment layer.

An alignment layer in an LCOS device may be formed from any suitable material or materials. For example, it may be formed as a coating on another layer. For example, it may be formed as a polyimide (PI) coating on a substrate, such as on one or both electrode layers in an LCOS device. In such embodiments, the alignment layer may be referred to as being a "PI layer". For example, the alignment layer may comprise a photosensitive material. For example, the alignment layer may comprise reactive mesogens that react to exposure to ultraviolet (UV) light.

Whilst the singular term "alignment layer" has been used herein, for ease of reference, in practice each "alignment layer" may in fact comprise multiple individual layers, or planes. For example, an alignment layer may comprise a stack of layers, such as a stack of polyimide layers.

Pretilt and surface anchoring are independent of each other. However, the present inventor has identified a set of parameters that enable each of these two factors to work in harmony, to provide improved operation of a birefringent cell, such as a cell of an LCOS spatial light modulator device. Any suitable methods may be used to alter the pretilt and surface anchoring that an alignment layer provides. However, some possible methods are discussed below. It should be understood that these methods are provided for illustrative purposes only and are not limiting on the present disclosure.

Surface Anchoring

The improvements disclosed herein include processing one or more alignment layers of a spatial light modulator (SLM) such as an LCOS device so that it/they provide(s) a lower-than-conventional level/strength of surface anchoring, with respect to the LC's of adjacent LC layer. The alignment layer may be configured to be in physical contact with the LC layer.

The present inventor has identified that, when a relatively weak surface anchoring is provided through the alignment layer, it enables the LC directors in the LC layer to be aligned quickly, when an electric field is applied thereto. This improves order and enables switching speed of the LCOS to be increased. The present inventor has further identified that this beneficial effect is magnified when an increased pretilt is applied, as detailed further below. The present inventor has further identified that weak anchoring makes it possible to achieve high contrast ratio under low voltages and improved steepness (LC deformation in bulk) in the electro-optic response.

In practice, for any given SLM, the approach selected for processing the alignment layer(s) to provide a desired degree of surface anchoring for an alignment layer may depend on one or more of a variety of factors such as, for example, what the alignment layer is formed from and/or the type of LC's and/or the size or type or intended purpose of the LCOS device. Other practical considerations such as cost and available resources may also be factors.

By way of example, surface anchoring can be varied by changing alignment layer thickness. In particular, the anchoring strength can be decreased by decreasing the thickness of the alignment layer. The anchoring of an LC layer to/with an alignment layer results from the anisotropic inter-molecular interactions between the liquid crystal molecules and the alignment layer molecules, which may for example comprise polymer chains. The interactions (which comprise "Van der Waals" interactions) of the LC molecules with the alignment surface molecules will be strong when the anisotropic directions of both the liquid crystal and alignment layer molecules (e.g., polymers) are in the same direction. Therefore, by changing the strength/pressure of mechanical rubbing that is applied to the surface of the alignment layer, the intermolecular interactions—and therefore the strength of the surface anchoring—can be varied. In other words, the present inventor has identified that, by changing the rubbing strength and/or direction of the alignment layer surface molecules (e.g., the polymer chains) one can create disturbance of the interaction of LC's and the alignment layer molecules, thereby reducing the surface anchoring. This can be done in a controlled and selective manner, in order to achieve a desired relatively low level of surface anchoring, in accordance with the improvements disclosed herein. Combining a thin alignment layer with a change in direction and/or strength/pressure of the mechanical rubbing that is applied thereto can be beneficial in achieving the desired low level of surface anchoring.

The present inventor has further identified that introducing surface and/or grating patterns on an alignment layer can help the LC directors in the adjacent LC layer to break free from the surface anchoring quickly. This helps the LCOS to have a faster switching speed. It also enables the so-called "LC threshold"/"Freedericksz transition" to reduce, which means it enables a greater phase range to be achieved for an LC (or, an LC layer), without increasing the required magnitude of voltage that is applied thereto. Therefore, the LC cell has an improved dynamic range, as compared to conventional LC cells.

Pretilt Angle

The improvements disclosed herein may further include processing one or more alignment layers of a spatial light modulator (SLM) such as an LCOS device so that it/they provide(s) a relatively high pretilt angle to the adjacent LC layer. In practice, for any given SLM, the approach selected for processing the alignment layer(s) to provide a desired pretilt may depend on one or more of a variety of factors such as, for example, what the alignment layer is formed from and/or the type of LC's and/or the size or type or intended purpose of the SLM. Other practical considerations such as cost and available resources may also be factors.

By way of example, the alignment layer may be formed from a material with high heat resistance, such as a high-performance plastic, for example polyimide (PI). Polyimide (PI) is a polymer of imide monomers and is used in a variety of applications that require robust organic materials. A desired pretilt may be achieved, with a polyimide alignment layer, by exposing the alignment layer to ozone treatment or by using a low energy ion beam to alter the pretilt. In other embodiments, the alignment layer is or comprises an organic material such as PI, PVA or Nylon 66. In other embodiments, the alignment layer is or comprises an inorganic material such as $SiO_x$ or $MgF_2$. Moreover, selective pretilt variation (i.e., changing the pretilt between different respective areas on the alignment layer) can be achieved by masking selected pixels and/or by printing PI layers (or partial layers) on top of each other and/or next to each other.

It is known to use mechanical rubbing of an alignment layer surface, in order to impart a pretilt on adjacent LC crystals, and to influence the direction in which their directors point. In order to provide selective pretilt variation, it is further possible to imprint selected patterns, for example stripes, parallel to the alignment surface rubbing direction. It is further possible to provide a mixture of horizontally and vertically aligned pretilt levels, across an alignment layer surface, in order to obtain intermediate pretilt angles.

An alignment layer may instead or also comprise photo sensitive material (which may be referred to as a "photo alignment material"). Such photosensitive material may be coated on a substrate and can be irradiated with, for example, UV or IR light in order to cause a controlled reaction and thereby achieve a desired pretilt angle. An alignment layer may instead or also comprise reactive mesognes (RM), which is a polymer network. An RM alignment layer can be aligned/processed using light controlled light exposure, in a similar manner to a photo alignment material. The present inventor has identified that reactive Mesognes (RM) are controllable by a particular/selected wavelength of light (e.g. UV light), so—in some embodiments—can effectively be used to pattern an alignment layer with a mask, thereby providing localised alignment regions of different angles or heights. In some embodiments, the alignment layer is locally different at the pixel edges, as compared to the central/main part of the pixels, to help manage the fringing field effects.

The present inventor has identified that a range of relatively high pretilt angles, used in conjunction with a relatively low level of surface anchoring, provides beneficial results for an LCOS device. For example, the pretilt angle may be in the range 5 to 25 degrees, such as 10 to 25 degrees, or 15 to 25 degrees.

The improvements disclosed herein may be further understood by the following examples.

Figure 4:
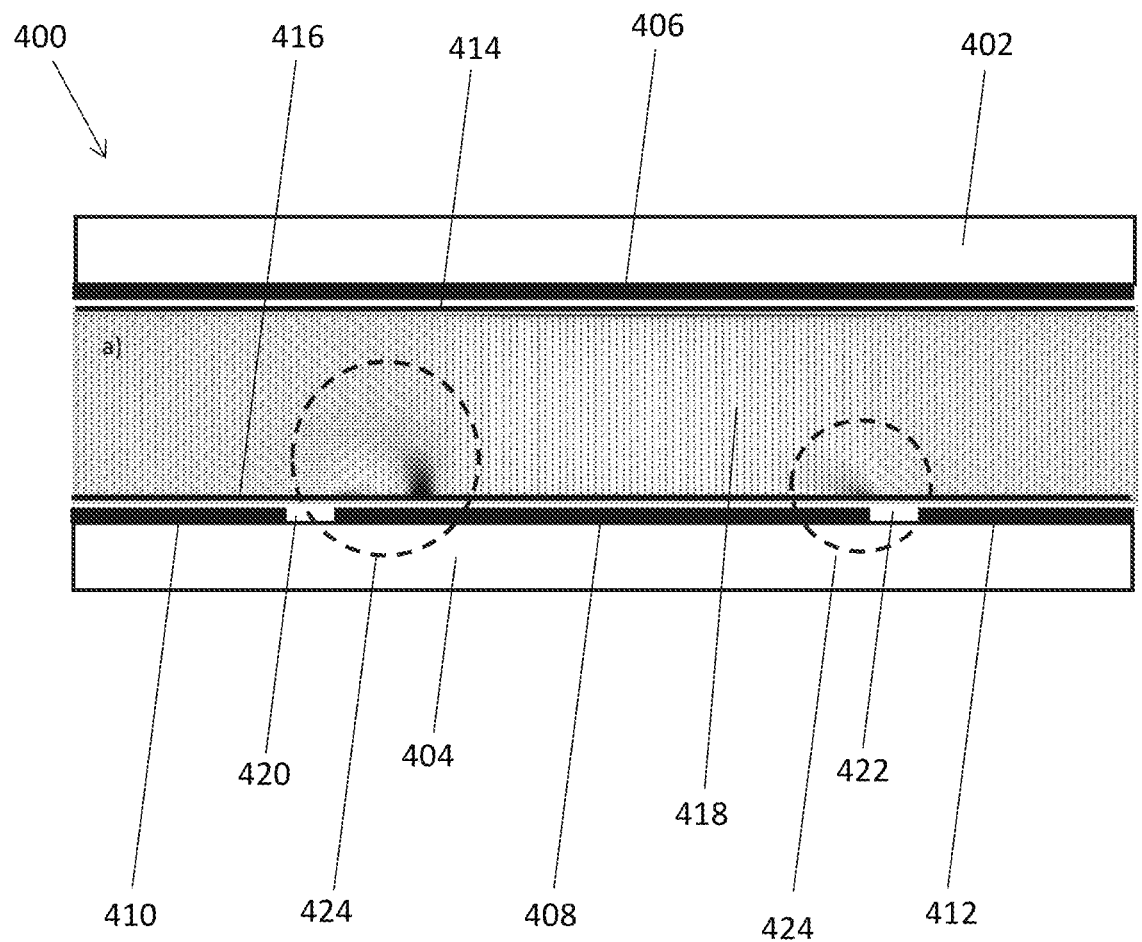
FIG. 4 is a schematic of LC distortion in a typical LCOS SLM.

FIG. 4 shows a schematic of a conventional (or "typical") LCOS device 400. The device 400 comprises (as a top layer, in the orientation shown in FIG. 4) a first substrate 402 that may comprise a transparent layer of, for example, glass. A common electrode 406, such as a single transparent electrode 406, is provided below the first substrate 402. There is also a second substrate 404 provided as a bottom layer (in the orientation shown in FIG. 4), wherein the second substrate 404 may, for example, comprise a single crystal silicon substrate. The second substrate 404 has circuitry buried therein via which the 2D array of pixel electrodes thereabove may be addressed. In FIG. 4, a first pixel electrode 408, second pixel electrode 410, and a third pixel electrode 412 may be seen as being comprised within the 2D array of pixel electrodes. There is a first inter-pixel gap 420 provided between the first pixel electrode 408 and the second pixel electrode 410 and there is a second inter-pixel gap 422 provided between the first pixel electrode 408 and third pixel electrode 412.

An LC (liquid crystal) layer 418 is sandwiched by the common electrode 406 and the array of pixel electrodes 408, 410, 412, such that a voltage applied between a pixel electrode 408, 410, 412 and the common electrode 406 may induce a change in the LC layer 418, as is well understood by the person skilled in the art. The LC layer 418 has so-called "planar" or "homogenous" alignment. Accordingly, in the absence of an electric field, the orientation of the liquid crystal molecules is substantially parallel to the first and second substrates 402, 404.

A first alignment layer 414 is provided between the common electrode 406 and the top of the LC layer 418 and a second alignment layer 416 is provided between the bottom of the LC layer 418 and the array of pixel electrodes 408, 410, 412.

The pretilt in the alignment layers 414, 416 of the typical LCOS device 400 in FIG. 4 is approximately 5 degrees and the surface anchoring is approximately 1e-3 J/m². Due to the planar or homogenous alignment, the surface anchoring energy is substantially parallel to the respective alignment layers 414, 416. Thus, the surface anchoring energy may also be referred to as parallel anchoring strength or simply parallel strength.

In FIG. 4, the differently shaded portions within the LC layer 418—located within the circled areas 424—represent non-uniformities in the order of the LC crystals, when a voltage of approximately 6V is applied across the central pixel cell (comprising the first pixel electrode 408). These non-uniformities lead to changes to the phase retardance that is achievable in these areas 424, as compared to the otherwise-expected values. The non-uniformities in FIG. 4 stretch upwards from the first pixel electrode 408, through the LC layer 418, and may be referred to as being a "reorientation wall". It can be seen in FIG. 4 that the non-uniformities make up a significant portion of the LC layer 418, and in practice will have a noticeable effect on the phase retardance that the central cell provides.

Figure 5:
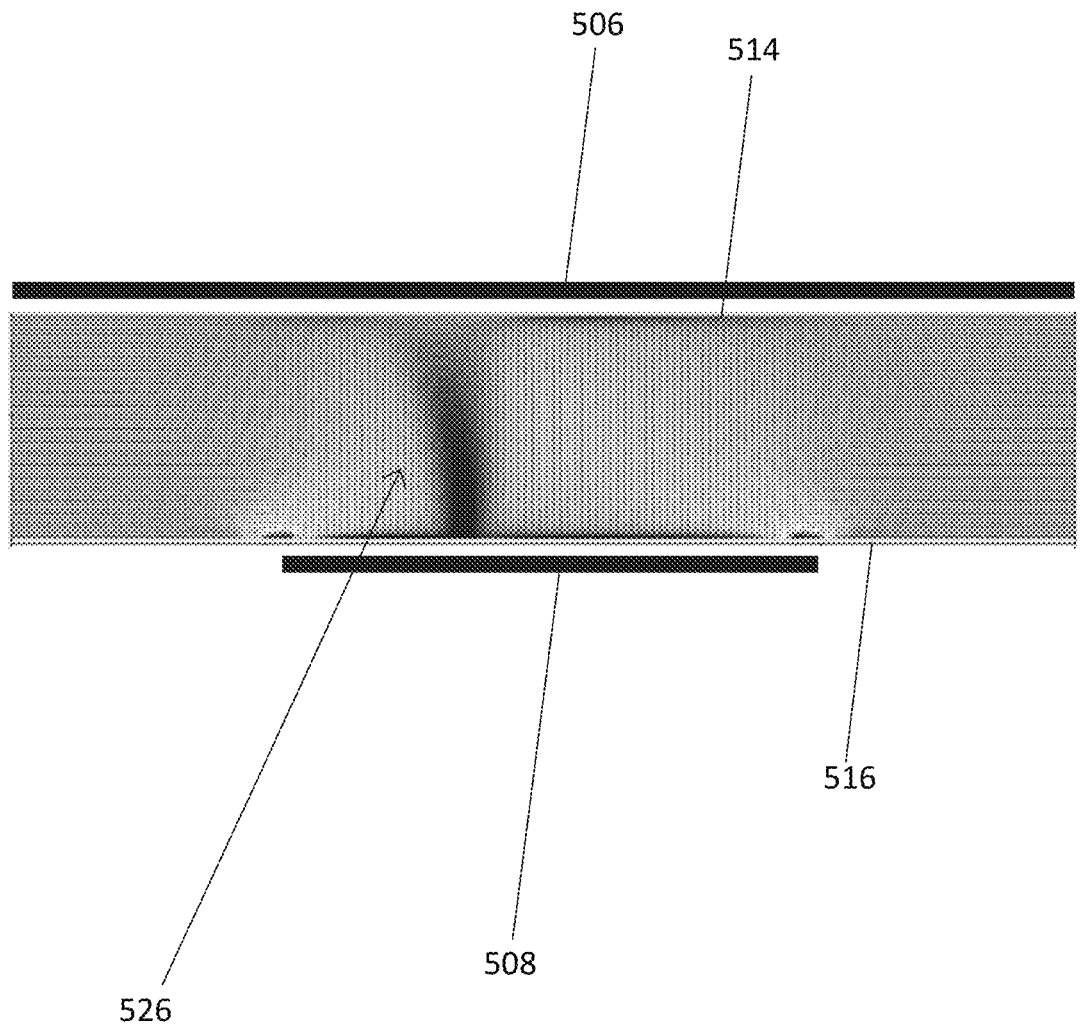
FIG. 5 is a schematic of LC distortion in a typical LCOS SLM.

FIG. 5 shows, by way of further example, another conventional LCOS device that has an LC layer 526 of a similar type and thickness to the LC layer 418 in FIG. 4, and alignment layers 514, 516 that are similar to the alignment layers 414, 416 of FIG. 4. The pretilt in FIG. 5 is approximately 5 degrees and the surface anchoring is 1e-3 J/m². The electrodes 506, 508 are also similar to those shown in FIG. 4 although, for brevity, only a central pixel electrode 508 is shown in FIG. 5. In practice, other pixel electrodes would be present, either side of the illustrated pixel electrode 508, spaced apart by respective inter-pixel gaps. The alignment layers 514, 516 in FIG. 5 have been mechanically rubbed in a direction perpendicular to the electrodes 506, 508.

Similarly to FIG. 4, the differently shaded portions in FIG. 5 show the non-uniformities within the LC layer 526. It can be seen that there are non-uniformities at the inter pixel gaps and there is also some non-uniformity across most of the breath of the pixel electrode 508. That non-uniformity, in one part near the centre of the pixel electrode 508, reaches upwards and touches the top of the LC layer 526, and indeed funnels outwards, increasing in breadth as it approaches the top of the LC layer 526. This presence of non-uniformity across the entire thickness of the LC layer 526, and in a substantially central part of the pixel electrode 508, causes significant disturbance to the phase retardance that the pixel electrode can provide in that region. The overall performance of the device in FIG. 5 will therefore be compromised. In this example, the non-uniformity is considered a disclination.

Figure 6:
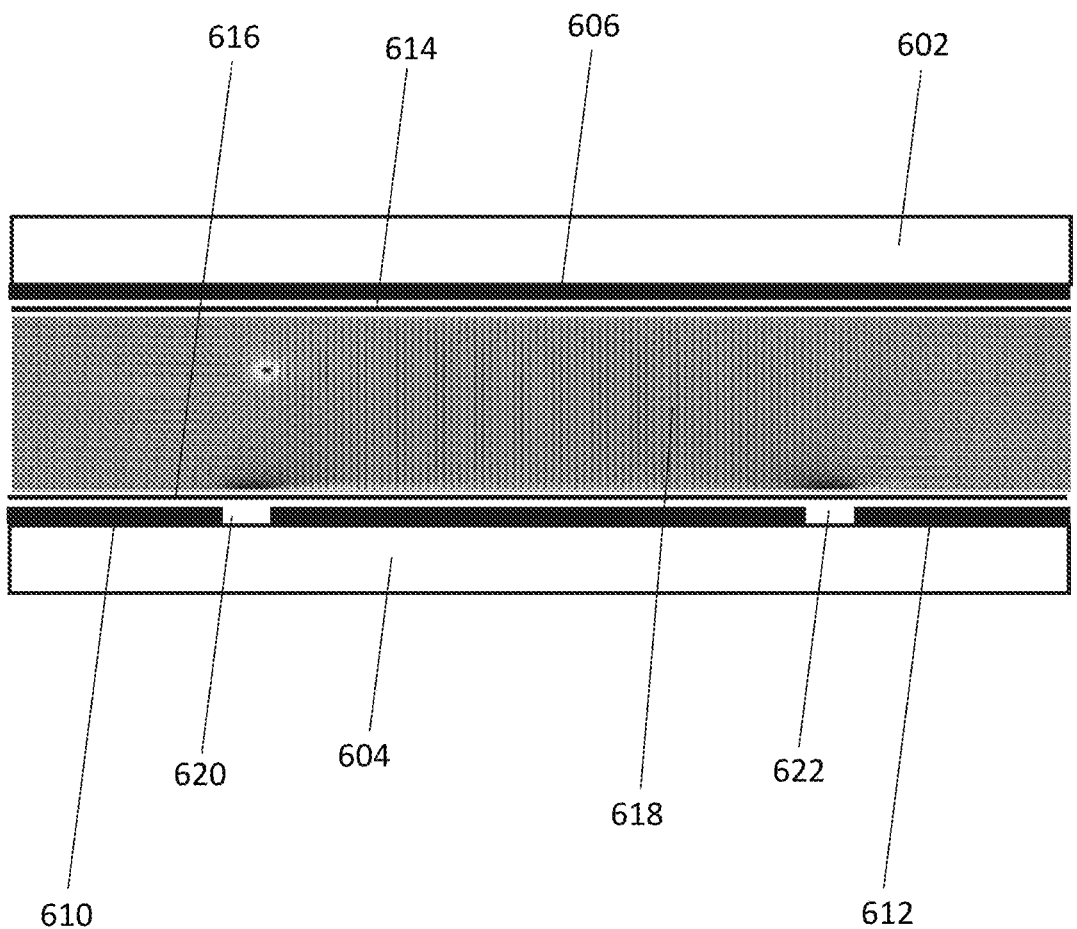
FIG. 6 is a schematic of LC distortion in an improved LCOS SLM, in accordance with embodiments.

By way of comparison, FIG. 6 comprises an LCOS device 600 that is similar to the LCOS device of FIG. 5 except that the first 614 and second 616 alignment layers in FIG. 6 have been processed/fabricated in accordance with the improvements disclosed herein. In particular, the alignment layers 614, 616 have been processed to exhibit parameter values that are within the optimised parameter ranges identified by the present inventor. In this example, the surface anchoring has been reduced, by any suitable method, to 1e-4 J/m² and the pretilt has been increased, again by any suitable method, to 20 degrees. However, the present disclosure is not limited to these particular values. For example, the benefits identified by the present inventor may be seen for an alignment layer (or layers) for which the pretilt is changed to be greater than 10 degrees, for example between 10 degrees and 25 degrees and surface anchoring of alignment layer is changed to be less than 1 mJ/m² (i.e., reduced to be less than 1e-3 J/m²).

It can be seen that, whilst some slight disinclination is still present, the non-uniformities make up a very small part of the LC layer 618 in FIG. 6. Moreover, they are almost entirely located at or close to the inter-pixel gaps 620, 622 and adjacent switched "OFF" pixels, as opposed to being located over a main/central part of the switched "ON" central pixel. The disorder is also located only in a lower part of the LC layer in FIG. 6. Therefore, the disturbance to phase retardance that these non-uniformities cause is much reduced, as compared to conventional LCOS devices.

Figure 7:
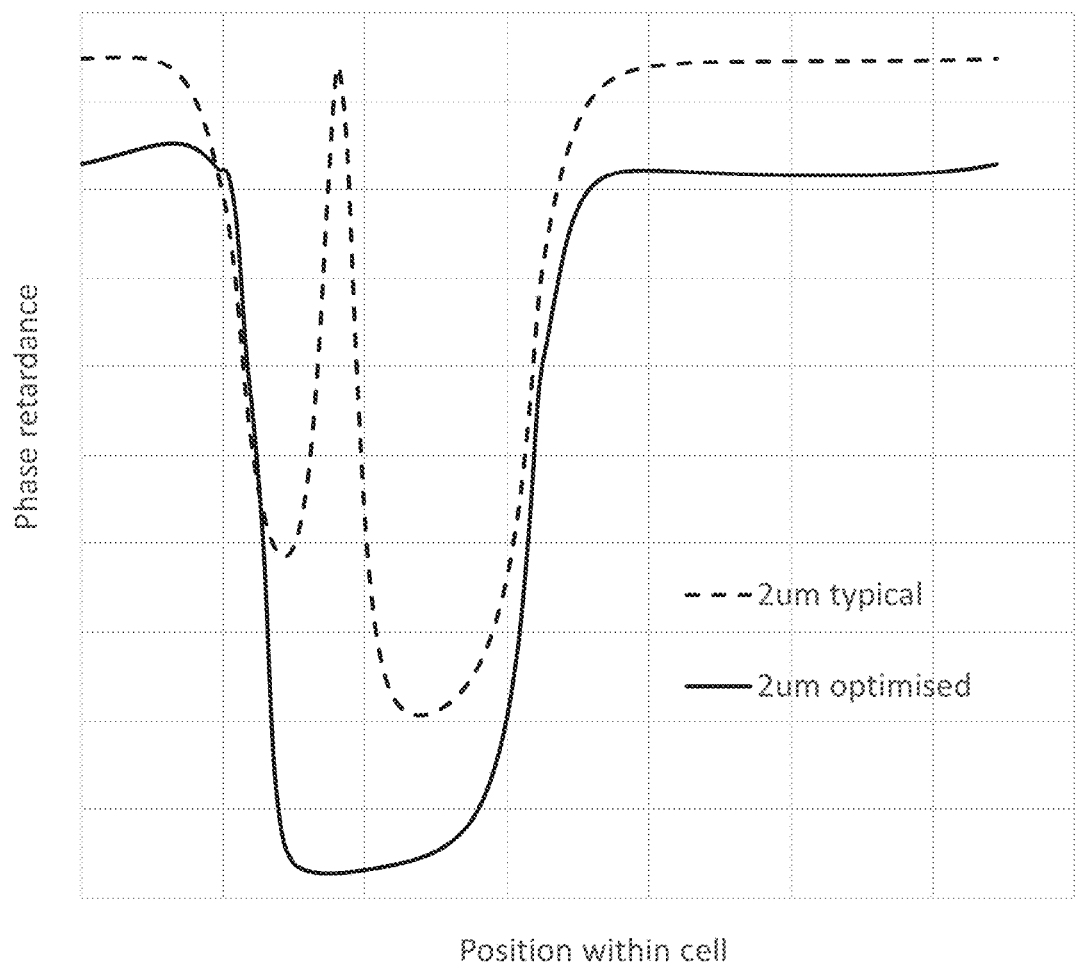
FIG. 7 shows a comparison of phase retardance variation with voltage for a conventional LCOS SLM and an improved SLM, optimised in accordance with embodiments.

The benefits associated with the improvements disclosed herein can be observed for a range of different thicknesses of LCOS device—i.e., for LCOS devices having a range of different cell gaps. As the skilled reader will be aware, the "cell gap" may be defined as the distance between the upper and lower alignment layers of the LCOS, in a direction perpendicular to the planes of those substrates. FIG. 7 illustrates the phase retardance, calculated perpendicular to the electrodes, as it varies with position along the central pixel electrode, in each of two devices that have a 2 µm cell gap, when a 5V potential is applied thereto. The "optimised" device in FIG. 7 has an increased pretilt and reduced surface anchorage, as compared to the "typical" LCOS in FIG. 7. Specifically, the surface anchoring strength of the typical LCOS is $1\times10^{-3}$ J/m$^2$, whereas the surface anchoring strength of the optimised LCOS is $1\times10^{-4}$ J/m$^2$. The pretilt of the typical LCOS in FIG. 7 is 4° (4 degrees) whereas the pretilt of the optimised LCOS is 20° (20 degrees).

In FIG. 7, the LCOS devices have been configured so that maximum retardance should be achieved when V=0 and minimum (ideally, zero) retardance is achieved when V=V (in this case, V=5 Volts). As can be seen, the typical LCOS, with 2 µm cell gap, of FIG. 7 exhibits a sharp spike in phase retardance, across a significant part of the pixel electrode's breadth, when a voltage of 5V is applied thereto. On the other hand, the phase retardance provided by the optimised LCOS, with 2 µm cell gap, is largely constant across the pixel electrode's breadth, and equals or is close to zero. FIG. 7 therefore illustrates the recognitions made by the present inventor that, when the surface anchoring and pretilt of the alignment layer(s) are optimised in accordance with the recognitions disclosed herein, the LC directors in a switched ON pixel cell (above a switched ON pixel electrode) align substantially homeotropically, which increases the overall efficiency and predictability of the LCOS device. Therefore, by embodying the recognitions made by the present inventor, an optimised cell (and an LCOS or other SLM comprising one or more such optimised cells) can provide a more reliable, uniform, and predictable phase retardance, for any given voltage, with changes/spikes limited largely to the inter pixel gaps and/or to switched OFF cells.

Figure 8:
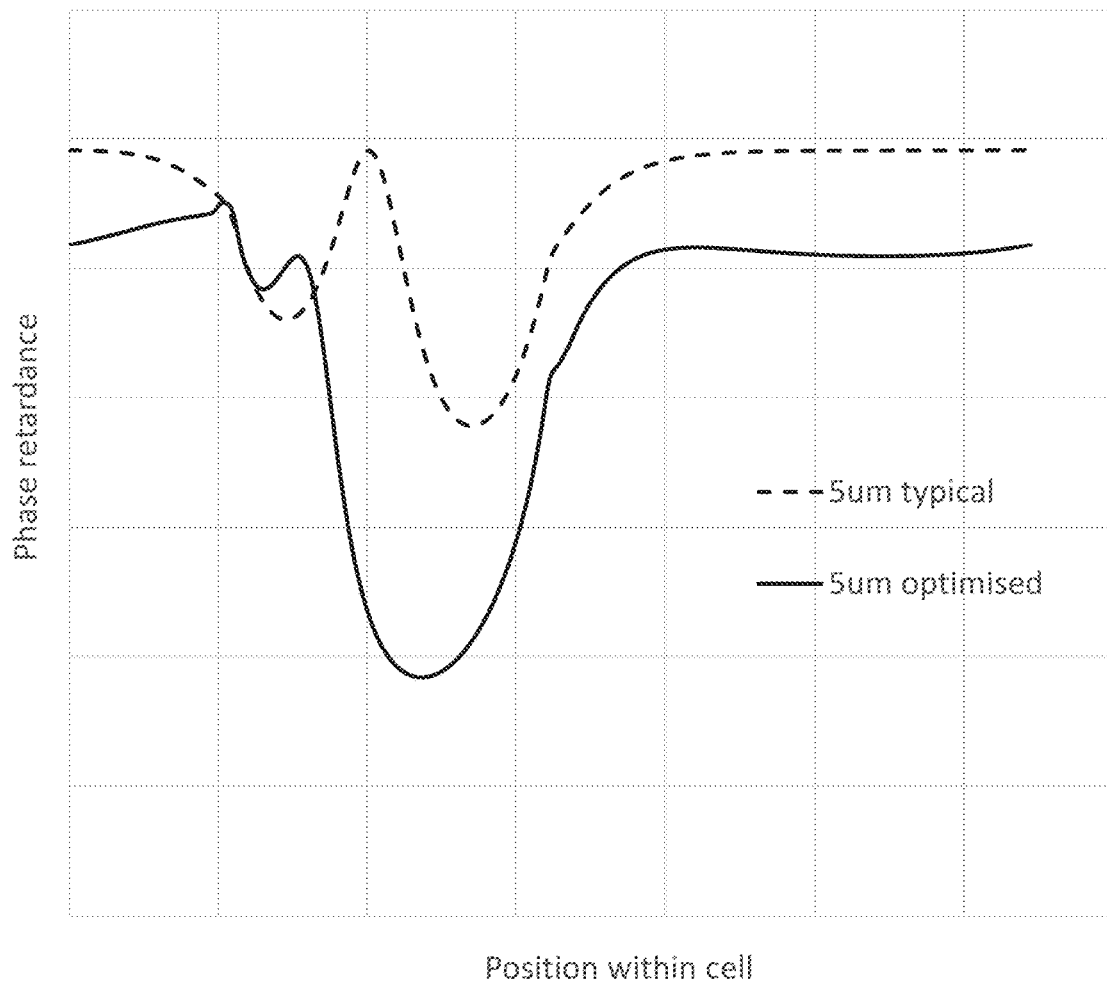
FIG. 8 shows a comparison of phase retardance variation with voltage for a conventional LCOS SLM and an improved SLM, optimised in accordance with embodiments.

FIG. 8 is similar to FIG. 7, but showing a comparison of how phase retardance varies with cell position for a typical LCOS with a 5 µm cell gap and an LCOS with a 5 µm cell gap that has been optimised in accordance with the improvements disclosed herein. That is, the pretilt in the alignment layer(s) of the optimised LCOS in FIG. 8 is approximately 20 degrees and the surface anchoring is 1e-4 J/m$^2$, whereas the pretilt in the alignment layer(s) of the typical LCOS in FIG. 8 is approximately 4 degrees and the surface anchoring is 1e-3 J/m$^2$.

As was the case for FIG. 7, it can be seen in FIG. 8 that providing an optimisation comprising a relatively high pretilt angle and a relatively low level of surface anchoring reduces the size (i.e., the magnitude) of the spike seen in phase retardance, over the switched-ON electrode, and also pushes the spike closer to the inter-pixel gap (and/or towards adjacent switched OFF pixels). This is because the optimised parameters disclosed herein enable higher ordering of the LC directors, which results in the LC directors aligning substantially homeotropically when a voltage is applied thereto, which is not achievable in the typical LCOS arrangement due to effects such as fringing field effects.

Although, it may be observed that the improvement in phase retardance avoidance for the optimised LCOS having a 5 µm cell gap is not as pronounced as it is for the optimised LCOS with a 2 µm cell gap represented in FIG. 7, the present inventor has identified that the provision of a high pretilt angle and low level of surface anchoring nonetheless provides benefits for an LCOS device with range of cell gaps, up to and including a cell gap of approximately 20 µm. For example, the cell gap may be between 15 µm and 20 µm, or between 10 µm and 20 µm, or between 5 µm and 20 µm, or between 2 µm and 20 µm, or between 1 µm and 20 µm. Moreover, the present inventor has identified that the beneficial effects and improved performance as a result of the optimisations disclosed herein, as compared to typical LCOS arrangements, are more pronounced at lower voltages (for example, at approximately 5V to 8V) than at higher voltage (for example, at approximately 9V to 16V). Thus, again, the present inventor has gone against the conventional bias that suggests increasing voltage above practical levels (e.g., to 10V or more) would provide improvements with respect to disorder, defects or disclinations in an LC layer. Instead, the present inventor has identified that processing the alignment layer(s) to have an increased pretilt angle and reduced surface anchorage works well at lower voltages, in the range more typically applied to LC devices (e.g., up to approximately 6V.)

As mentioned above, one benefit of the optimisations disclosed herein is the improvement of dynamic range for an LCOS device. In other words, the optimisations disclosed herein enable the difference between the maximum and minimum retardances that an LC cell can provide, across a range of voltages, to increase as compared to conventional arrangements. This is illustrated in FIGS. 9 and 10.

Figure 9:
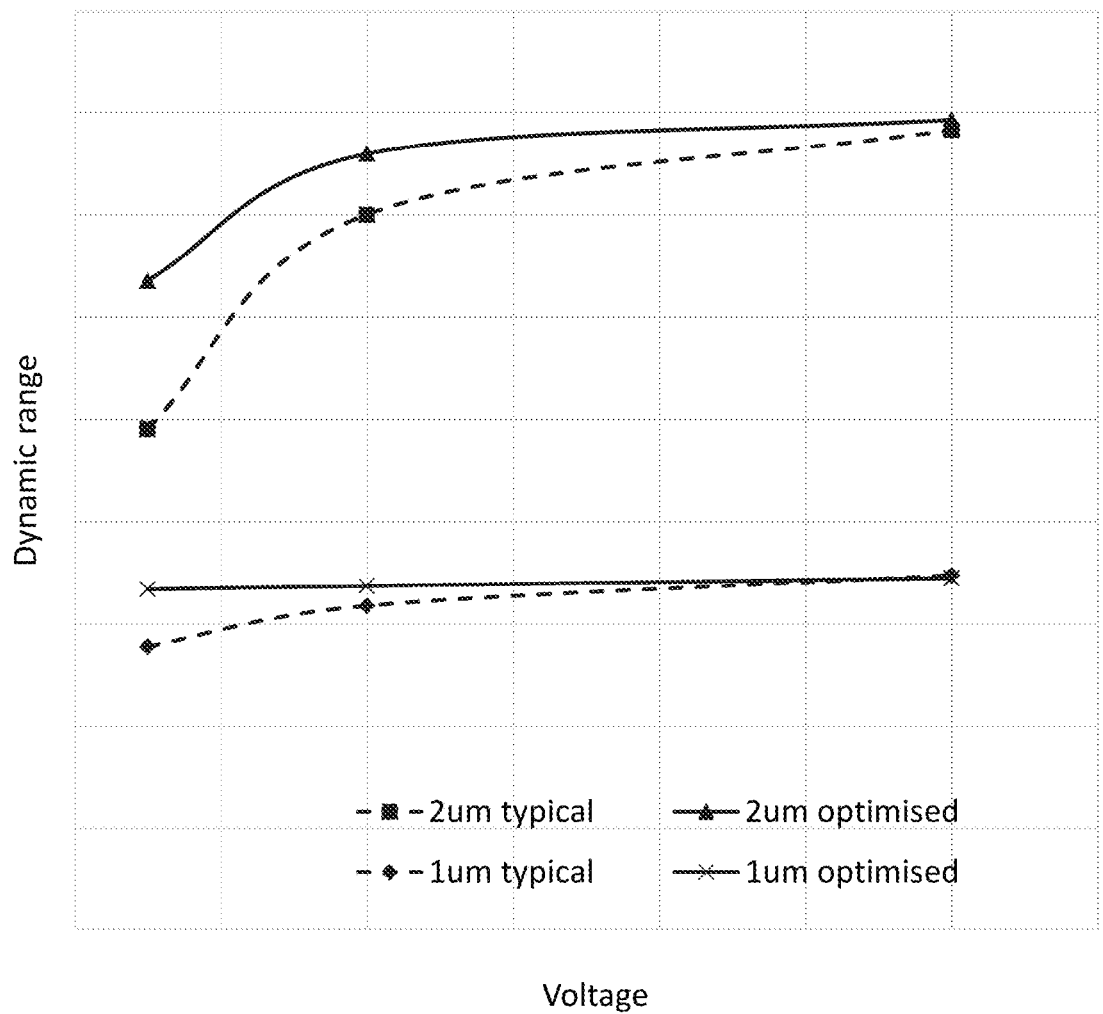
FIG. 9 shows a comparison of dynamic range for a conventional LCOS SLM versus an improved SLM, optimised in accordance with embodiments.

In FIG. 9, the improvement to dynamic range that the presently disclosed optimisations enable can be seen. It shows dynamic range as a function of voltage for a "typical" LCOS device and an "optimised" LCOS device, for cell gaps of each of 1 µm and 2 µm. The pretilt in the alignment layer(s) of each optimised LCOS in FIG. 9 is approximately 20 degrees and the surface anchoring is 1e-4 J/m$^2$, whereas the pretilt in the alignment layer(s) of the typical LCOS in FIG. 9 is approximately 4 degrees and the surface anchoring is 1e-3 J/m$^2$. As can be seen, in each case the optimised device provides a larger dynamic range than is achievable for the typical device, particularly at lower voltages.

Figure 10:
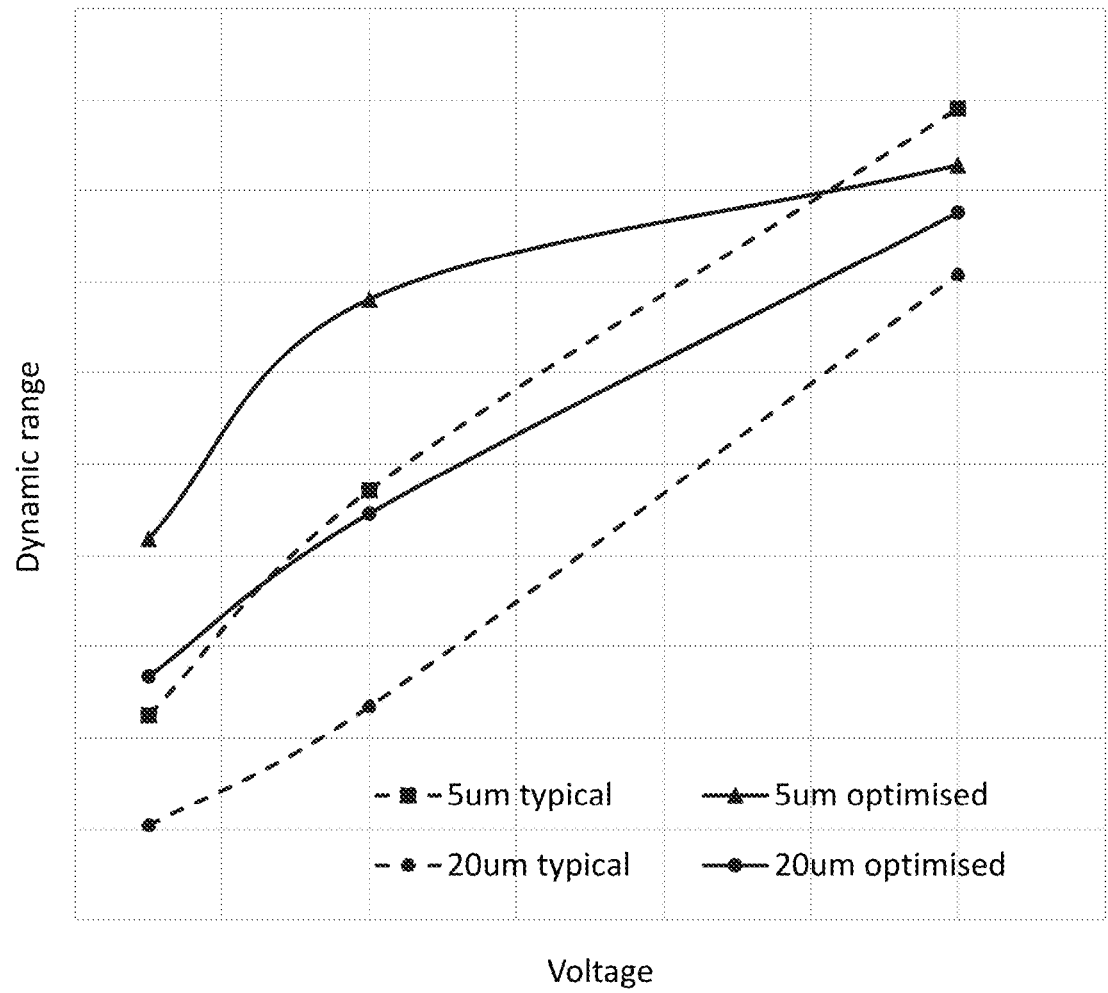
FIG. 10 shows a comparison of dynamic range for a conventional LCOS SLM versus an improved SLM, optimised in accordance with embodiments.

FIG. 10 shows another illustration, similar to FIG. 9, but for a "typical" LCOS device and an "optimised" LCOS device, for cell gaps of each of 5 µm and 20 µm. The pretilt in the alignment layer(s) of each optimised LCOS in FIG. 10 is approximately 20 degrees and the surface anchoring is 1e-4 J/m$^2$, whereas the pretilt in the alignment layer(s) of the typical LCOS in FIG. 10 is approximately 4 degrees and the surface anchoring is 1e-3 J/m$^2$. As can again be seen, in each case the optimised device provides a larger dynamic range than is achievable for the typical device, particularly at lower voltages.

Thus, an improved ECB device—such as spatial light modulator (SLM), for example, LCOS SLM—is provided. An improved method of fabricating an ECB device or SLM, and of processing an alignment layer for an ECB device or SLM, to achieve the improvements described herein, is also provided. The processing comprises specifically lowering the surface anchoring, and optionally also raising the pretilt angle, of the alignment layer as compared to the values seen in conventional devices. This has the benefit of reducing distortions (or "disclinations") in the liquid crystal (LC) layer when a voltage is applied thereto, which in turn has the effect of providing more consistent, reliable and predictable retardation, as a function of voltage. It further has the effect of reducing problematic effects seen in conventional devices such as fringing field effects, and also provides the benefit of an improved dynamic range. The benefits and advantages of the improvements disclosed herein are observed in a range of devices, of different thicknesses (i.e., having different cell gaps). The benefits and advantages are also observed for a range of pretilts—such as a pretilt angle in the range 10 to 25 degrees such as 15 to 25 degrees—and for a range of surface anchoring strengths—such as surface anchoring of less than 1 mJ/m$^2$.

The improved device—such as an improved LCOS device—disclosed herein may be configured to operate as a display device in any suitable optical arrangement. For example, it may be configured to display holograms, and may be comprised in a holographic projector system. Such a holographic projector system may include a light source and one or more additional suitable optical components such as one or more mirrors, lenses, display screens, light receiving surfaces, diffusers, optical combiners, and so on. Such a system may also comprise one or more sensors or detectors. The improved device disclosed herein may be comprised within a Head-up Display (HUD), for example in a vehicle, and/or in a Head-Mounted Display (HMD). The improved spatial light modulator disclosed herein may be comprised within a holographic LIDAR system.

Additional Features

In some embodiments, when the improved spatial light modulator is comprised within an optical arrangement that includes a light source, the light source is a laser such as a laser diode.

The methods and processes described herein may be embodied on a computer-readable medium. The term "computer-readable medium" includes a medium arranged to store data temporarily or permanently such as random-access memory (RAM), read-only memory (ROM), buffer memory, flash memory, and cache memory. The term "computer-readable medium" shall also be taken to include any medium, or combination of multiple media, that is capable of storing instructions for execution by a machine such that the instructions, when executed by one or more processors, cause the machine to perform any one or more of the methodologies described herein, in whole or in part.

The term "computer-readable medium" also encompasses cloud-based storage systems. The term "computer-readable medium" includes, but is not limited to, one or more tangible and non-transitory data repositories (e.g., data volumes) in the example form of a solid-state memory chip, an optical disc, a magnetic disc, or any suitable combination thereof. In some example embodiments, the instructions for execution may be communicated by a carrier medium. Examples of such a carrier medium include a transient medium (e.g., a propagating signal that communicates instructions).

It will be apparent to those skilled in the art that various modifications and variations can be made without departing from the scope of the appended claims. The present disclosure covers all modifications and variations within the scope of the appended claims and their equivalents.

What is claimed is:

1. A method of fabricating an electrically-controlled birefringence cell comprising a nematic liquid crystal in a planar alignment configuration arranged between a plurality of pixel electrodes and a common electrode, the electrically-controlled birefringence cell having a cell gap no more than 20 micrometers and an alignment layer arranged to impart a pretilt on liquid crystal in contact with the alignment layer, wherein the pretilt has a pretilt angle in a range of about 5 to 25 degrees, and wherein the method comprises:
   processing the alignment layer to achieve a surface anchoring value between the liquid crystal and the alignment layer of less than 1 mJ/m$^2$ such that, when a voltage is applied through the alignment layer to the liquid crystal, the electrically-controlled birefringence cell exhibits lower phase retardance within the liquid crystal between an individual pixel electrode and the common electrode as compared to a birefringence cell comprising a nematic liquid crystal in a planar alignment configuration arranged between a plurality of pixel electrodes and a common electrode having (i) a cell gap no more than 20 micrometers, (ii) an alignment layer arranged to impart a pretilt of less than 5 degrees on liquid crystal in contact with the alignment layer, and (iii) a surface anchoring value of more than 1 mJ/m$^2$ between the liquid crystal and the alignment layer.

2. The method of claim 1, wherein the pretilt has a pretilt angle in a range of about 10 to 25 degrees.

3. The method of claim 1, wherein the pretilt has a pretilt angle in a range of about 15 to 25 degrees.

4. The method of claim 1, wherein processing the alignment layer comprises rubbing characterized by at least one rubbing parameter.

5. The method of claim 4, wherein the at least one rubbing parameter comprises rubbing pressure.

6. The method of claim 1, wherein processing the alignment layer comprises providing an alignment layer thickness of no more than 100 nm.

7. The method of claim 1, wherein the cell gap is greater than 0.5 micrometers.

8. The method of claim 1, wherein the alignment layer comprises polyimide.

9. The method of claim 8, wherein processing the alignment layer comprises exposing the alignment layer to an energy ion beam.

10. The method of claim 8, wherein processing the alignment layer comprises exposing the alignment layer to an ozone treatment.

11. The method of claim 9, wherein the alignment layer comprises a stack of polyimide layers, wherein individual layers within the stack correspond to a different pretilt angle.

12. The method of claim 8, wherein processing the alignment layer further comprises obtaining intermediate pretilt angles by mixing two or more layers of polyimide materials that are horizontally or vertically aligned.

13. The method of claim 1, wherein the alignment layer comprises a photoalignment layer, and wherein processing the alignment layer comprises controlling exposure of the alignment layer to infrared or ultraviolet light.

14. The method of claim 1, wherein the alignment layer comprises reactive mesogens, and wherein processing the alignment layer comprises controlling exposure of the alignment layer to ultraviolet light.

15. The method of claim 1, wherein the surface anchoring value is no more than 0.1 mJ/m2.

16. The method of claim 1, wherein the liquid crystal has a birefringence greater than 0.2 such as greater than 0.3 or 0.4.

17. The method of claim 1, wherein the electrically-controlled birefringence cell is a Freedericksz cell.

18. The method of claim 1, wherein the alignment layer comprises a surface grating configured to influence a direction of orientation of the liquid crystal.

19. An electrically-controlled birefringence cell comprising a nematic liquid crystal in a planar alignment configuration arranged between a plurality of pixel electrodes and a common electrode, the electrically-controlled birefringence cell comprising:

a cell gap no more than 20 micrometers; and an alignment layer arranged to impart a pretilt angle in a range of 5 to 25 degrees and a surface anchoring value less than 1 $mJ/m^2$ on the liquid crystal in contact with the alignment layer such that, when a voltage is applied through the alignment layer to the liquid crystal, the electrically-controlled birefringence cell exhibits lower phase retardance within the liquid crystal between an individual pixel electrode and the common electrode as compared to a birefringence cell comprising a nematic liquid crystal in a planar alignment configuration arranged between a plurality of pixel electrodes and a common electrode having (i) a cell gap no more than 20 micrometers, (ii) an alignment layer arranged to impart a pretilt of less than 5 degrees on liquid crystal in contact with the alignment layer, and (iii) a surface anchoring value of more than 1 $mJ/m^2$ between the liquid crystal and the alignment layer.

20. The electrically-controlled birefringence cell of claim 19, wherein the pretilt angle comprises an angle of (i) about 10 to 25 degrees or (ii) about 15 to 25 degrees.

* * * * *